US009755798B2

United States Patent
Centonza et al.

(10) Patent No.: US 9,755,798 B2
(45) Date of Patent: Sep. 5, 2017

(54) METHODS PROVIDING CONFIGURATION PARAMETERS FOR INTER BASE STATION COORDINATED MULTIPOINT COMMUNICATIONS

(71) Applicant: Telefonaktiebolaget L M Ericsson (publ), Stockholm (SE)

(72) Inventors: Angelo Centonza, Winchester (GB); Mattias Frenne, Uppsala (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 35 days.

(21) Appl. No.: 14/647,982

(22) PCT Filed: May 4, 2015

(86) PCT No.: PCT/SE2015/050488
§ 371 (c)(1),
(2) Date: May 28, 2015

(87) PCT Pub. No.: WO2015/171055
PCT Pub. Date: Nov. 12, 2015

(65) Prior Publication Data
US 2015/0349908 A1    Dec. 3, 2015

Related U.S. Application Data

(60) Provisional application No. 61/988,484, filed on May 5, 2014, provisional application No. 62/000,972, filed on May 20, 2014.

(51) Int. Cl.
*H04L 5/00*    (2006.01)
*H04W 72/12*    (2009.01)
(Continued)

(52) U.S. Cl.
CPC .......... *H04L 5/0035* (2013.01); *H04B 7/024* (2013.01); *H04J 11/0053* (2013.01);
(Continued)

(58) Field of Classification Search
CPC .. H04W 24/02–24/10; H04W 72/04–72/1294; H04B 7/02–7/14
See application file for complete search history.

(56) References Cited

U.S. PATENT DOCUMENTS

2015/0263834 A1* 9/2015 Won ........................ H04B 7/022
370/329
2015/0312893 A1* 10/2015 Prasad ................... H04B 7/024
370/328
(Continued)

FOREIGN PATENT DOCUMENTS

EP        2 693 655 A1    2/2014

OTHER PUBLICATIONS

International Preliminary Report on Patentability, Application No. PCT/SE2015/050487, May 20, 2016.
(Continued)

*Primary Examiner* — Marcus R Smith
(74) *Attorney, Agent, or Firm* — Sage Patent Group

(57) ABSTRACT

Methods of operating a base station in a radio access network (RAN) may be provided. In particular, a message may be communicated (e.g., transmitted or received) between the base station and another node of the radio access network, and the message may include a Coordinated Multipoint (CoMP) hypothesis field, a benefit metric field, and a cell identification field. Communicating may include transmitting the message to the other node of the radio access network, or communicating may include receiving the message from the other node of the radio access network.

19 Claims, 23 Drawing Sheets

(51) Int. Cl.
H04B 7/02 (2017.01)
H04J 11/00 (2006.01)
H04B 7/024 (2017.01)
H04W 52/36 (2009.01)
H04W 92/20 (2009.01)
H04B 7/022 (2017.01)

(52) U.S. Cl.
CPC .......... *H04L 5/0007* (2013.01); *H04L 5/0073* (2013.01); *H04W 52/36* (2013.01); *H04W 72/1205* (2013.01); *H04W 72/1252* (2013.01); *H04W 72/1273* (2013.01); *H04B 7/022* (2013.01); *H04W 92/20* (2013.01)

(56) References Cited

U.S. PATENT DOCUMENTS

| | | |
|---|---|---|
| 2015/0312903 A1 | 10/2015 | Prasad et al. |
| 2016/0036571 A1* | 2/2016 | Park ...................... H04B 7/024 370/330 |
| 2016/0182198 A1* | 6/2016 | Won ...................... H04L 5/0035 370/329 |

OTHER PUBLICATIONS

International Search Report and Written Opinion Corresponding to International Application No. PCT/SE2015/050487; Date of Mailing: Aug. 3, 2015; 11 Pages.

International Search Report and Written Opinion Corresponding to International Application No. PCT/SE2015/050488; Date of Mailing: Jul. 31, 2015; 13 Pages.

Alcatel-Lucent et al. "Signalling Details and Procedures Supporting eCoMP", 3GPP TSG RAN WG1 Meeting #76bis, R1-141725, Shenzhen, China, Mar. 31-Apr. 4, 2014, 9 Pages.

LG Electronics "Inter-eNB CoMP signaling with non-ideal backhaul", 3GPP TSG RAN WG1 Meeting #76bis, R1-141836, Shenzhen, China, Mar. 31-Apr. 4, 2014, 6 Pages.

Qualcomm Incorporated "Inter-eNB CoMP: Hypotheses and Benefit Metric exchange", 3GPP TSG-RAN WG3 Meeting #84, R3-141175, Seoul, South Korea, May 19-23, 2014, 6 Pages.

Qualcomm Incorporated "Parameters for backhaul signaling", 3GPP TSG-RAN WG1 Meeting #76, R1-141445, Shenzhen, China, Mar. 31-Apr. 4, 2014, 6 Pages.

Samsung "Further evaluation results for inter-eNB CoMP", 3GPP TSG-RAN WG1 Meeting #76bis, R1-141806, Shenzhen, China, Mar. 31-Apr. 4, 2014, 5 Pages.

Samsung et al. "Way forward on Inter-eNB CoMP for LTE", 3GPP TSG-RAN1 #76bis Meeting, R1-141809, Shenzhen, China, Mar. 31-Apr. 4, 2014, 3 Pages.

ZTE "Remaining details on inter-eNB CoMP Signalling", 3GPP TSG RAN WG1 Meeting #76bis, R1-141408, Shenzhen, China, Mar. 31-Apr. 4, 2014, 4 Pages.

Lee, "LS on Inter-eNB CoMP for LTE", 3GPP TSG RAN WG1 Meeting #76bis, R1-141816, Shenzhen, China, Mar. 31-Apr. 4, 2014, 2 Pages.

3GPP TS 36.423 V12.0.0 (Dec. 2013) $3^{rd}$ Generation Partnership Project; Technical Specification Group Radio Access Network; Evolved Universal Terrestrial Radio Access Network (E-UTRAN); X2 application protocol (X2AP)(Release 12), 650 Route des Lucioles, Sophia Antipolis, Valbonne, France; 144 pages.

3GPP TS 36.213 V11.3.0 (Jun. 2013) $3^{rd}$ Generation Partnership Project; Technical Specification Group Radio Access Network; Evolved Universal Terrestrial Radio Access (E-UTRA); Physical layer procedures (Release 11), 650 Route des Lucioles, Sophia Antipolis, Valbonne, France; 176 pages.

U.S. Appl. No. 61/972,425, filed Mar. 31, 2014, Park et al.

\* cited by examiner

Figure 9A

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 .. <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 .. <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |

Figure 9B

| IE/Group Name | Presence | Range | IE type and reference | Semantics description | Criticality | Assigned Criticality |
|---|---|---|---|---|---|---|
| >>CoMP Hypothesis | O | | | Estimated resources for Inter eNB CoMP coordination | YES | ignore |
| >>Benefit Metric | O | | | Estimated benefit assuming Inter eNB CoMP coordination is achieved | YES | ignore |
| RSRP Measurements List | | 0..<maxRSRPMeasurements> | | | YES | ignore |
| >eNB-UE-X2AP-ID | M | | | X2AP ID of the UE reporting the RSRP measurement | | |
| >Cell ID | M | | ECGI 9.2.14 | ECGI of the cell measured by the UE | | |
| >RSRP Measurement | M | | | RSRP value measured by the UE for the ECGI indicated | | |

Figure 10A

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1..<maxCellineNB> | | | EACH | ignore |
| >>Cell ID | M | | ECGI 9.2.14 | Id of the source cell | – | – |
| >>UL Interference Overload Indication | O | | 9.2.17 | | – | – |
| >>UL High Interference Information | | 0..<maxCellineNB> | | | – | – |
| >>>Target Cell ID | M | | ECGI 9.2.14 | Id of the cell for which the HII is meant | – | – |
| >>>UL High Interference Indication | M | | 9.2.18 | | – | – |
| >>Relative Narrowband Tx Power (RNTP) | O | | 9.2.19 | | – | – |
| >>ABS Information | O | | 9.2.54 | | YES | ignore |
| >>Invoke Indication | O | | 9.2.55 | | YES | ignore |
| >>Inter eNB Coordination Info | O | | – | Used for Inter eNB CoMP Coordination | YES | ignore |

Figure 10B

| IE/Group Name | Presence | Range | IE type and reference | Semantics description | Criticality | Assigned Criticality |
|---|---|---|---|---|---|---|
| CoMP Hypothesis | M | | | Estimated resources for inter eNB CoMP coordination | YES | ignore |
| Benefit Metric | M | | | Estimated benefit assuming inter eNB CoMP coordination is achieved | YES | ignore |
| RSRP Measurements List | | 0.. <maxRSRPMeasurements> | | | YES | ignore |
| >eNB-UE-X2AP-ID | M | | | X2AP ID of the UE reporting the RSRP measurement | | |
| >Cell ID | M | | ECGI 9.2.14 | ECGI of the cell measured by the UE | | |
| >RSRP Measurement | M | | | RSRP value measured by the UE for the ECGI indicated | | |

Figure 13A

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1..<maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0..<maxCellineNB> | | | — | — |
| >>>Target Cell ID | M | | ECGI 9.2.14 | Id of the cell for which the HII is meant | — | — |
| >>>UL High Interference Indicator | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |

Figure 13B

| IE/Group Name | Presence | Range | IE type and reference | Semantics description | Criticality | Assigned Criticality |
|---|---|---|---|---|---|---|
| >>CoMP Hypothesis | O | | | Estimated resources for inter eNB CoMP coordination | YES | ignore |
| >>Benefit Metric | O | | | Estimated benefit assuming Inter eNB CoMP coordination is achieved | YES | ignore |
| RSRP Measurements List | | 0..<maxRSRPMeasurements> | | | YES | ignore |
| >eNB-UE-X2AP-ID | M | | | X2AP ID of the UE reporting the RNTP measurement | | |
| >CellID | M | | ECGI 9.2.14 | ECGI of the cell measured by the UE | | |
| >RSRP Measurement | M | | | RSRP value measured by the UE for the ECGI indicated | | |

Figure 14A

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1..<maxCellineNB> | | | EACH | ignore |
| >>Cell ID | M | | ECGI 9.2.14 | Id of the source cell | | |
| >>UL Interference Overload Indication | O | | 9.2.17 | | | |
| >>UL High Interference Information | | 0..<maxCellineNB> | | | | |
| >>>Target Cell ID | M | | ECGI 9.2.14 | Id of the cell for which the HII is meant | | |
| >>>UL High Interference Indication | M | | 9.2.18 | | | |
| >>Relative Narrowband Tx Power (RNTP) | O | | 9.2.19 | | | |
| >>ABS Information | O | | 9.2.54 | | YES | ignore |
| >>Invoke Indication | O | | 9.2.55 | | YES | ignore |
| >>Inter eNB Coordination Info | O | | | Used for Inter eNB CoMP Coordination | YES | ignore |

Figure 14B

| IE/Group Name | Presence | Range | IE type and reference | Semantics description | Criticality | Assigned Criticality |
|---|---|---|---|---|---|---|
| CoMP Hypothesis | M | | | Estimated resources for Inter eNB CoMP coordination | YES | ignore |
| Benefit Metric | M | | | Estimated benefit assuming Inter eNB CoMP coordination is achieved | YES | ignore |
| RSRP Measurements List | | 0..<maxRSRPMeasurements> | | | YES | ignore |
| >eNB-UE-X2AP-ID | M | | | X2AP ID of the UE reporting the RNTP measurement | | |
| >Cell ID | M | | ECGI 9.2.14 | ECGI of the cell measured by the UE | | |
| >RSRP Measurement | M | | | RSRP value measured by the UE for the ECGI indicated | | |

Figure 15A

| IE/Group Name | Presence | Range | IE type and reference | Semantics description | Criticality | Assigned Criticality |
|---|---|---|---|---|---|---|
| CoMP Information List | | 1 | | | | |
| >CoMP Hypothesis | M | <maxnoofCoMPHypothesis><br>BIT STRING (1..7200,...) | | Each position in the bitmap represents a resource block for which value "1" indicates 'not protected by interference' and 0 indicates 'protected by interference' | | |
| >Cell ID | M | | E-CGI | ID of the cell to which the CoMP Hypothesis IE applies. | | |

Figure 15B

| IE/Group Name | Presence | Range | IE type and reference | Semantics description | Criticality | Assigned Criticality |
|---|---|---|---|---|---|---|
| >Periodicity | M | ENUMERATED (5ms, 10ms, 20ms, 30ms, 40ms, 50ms ...) | | Repetition period of the CoMP Hypothesis | | |
| >BenefitMetric | M | INTEGER (-100..100, ...) | | Estimated benefit for the associated CoMP Hypothesis. Value zero indicates that the CH is interpreted as per embodiments described which may need to be interpreted together with the CellID. | | |

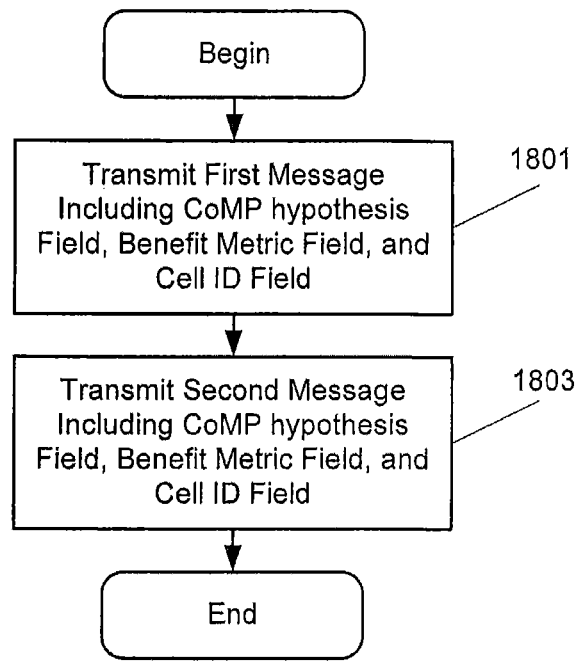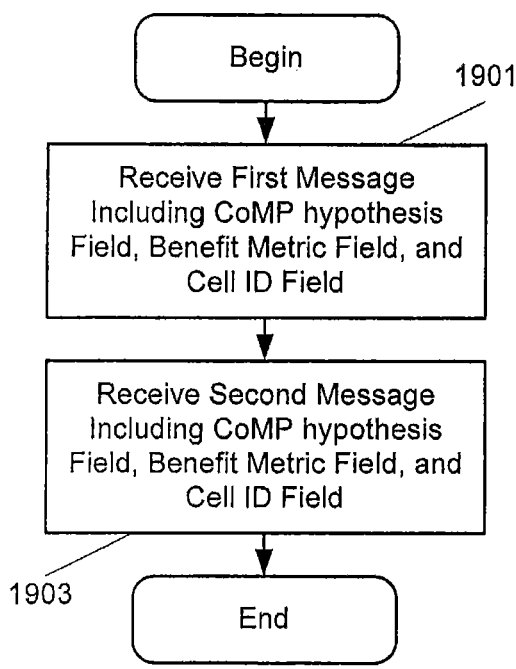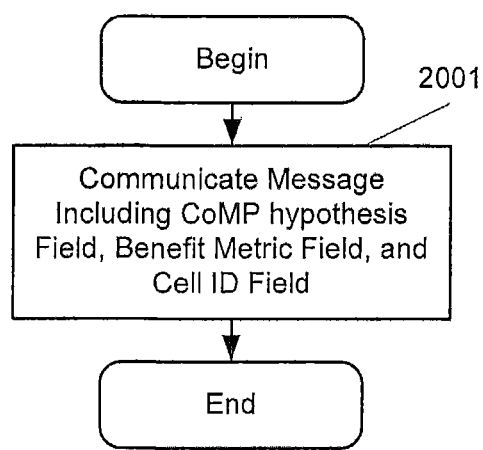

METHODS PROVIDING CONFIGURATION PARAMETERS FOR INTER BASE STATION COORDINATED MULTIPOINT COMMUNICATIONS

CROSS REFERENCE TO RELATED APPLICATION

This application is a 35 U.S.C.§371 national stage application of PCT International Application No. PCT/SE2015/050488, filed in the English language on 4 May 2015, which itself claims priority to U.S. Provisional Application No. 61/988,484 filed 5 May 2014 and U.S. Provisional Application No. 62/000,972 filed 20 May 2014, the disclosures and content all of which are incorporated by reference herein in their entirety.

BACKGROUND

The third generation partnership project (3GPP) is currently working on standardization of Release 12 of Long Term Evolution (LTE) concepts. The architecture of an LTE system is shown in FIG. 1, which illustrates logical interfaces between eNBs (X2) and between eNB and MME/S-GW (S1), including radio access nodes (eNBs or eNodeBs) and evolved packet core nodes (MME/S-GW). As can be seen, an S1 interface(s) connects eNBs to the MME/S-GW(s), while an X2 interface(s) connects peer eNBs.

The management system assumed in embodiments of inventive concepts is shown in FIG. 2. The node elements (NE), also referred to as eNodeB, are managed by a domain manager (DM), also referred to as the operation and support system (OSS). A DM may further be managed by a network manager (NM). Two NEs are interfaced using an X2 interface, whereas the interface between two DMs is referred to as an Itf-P2P interface. The management system may configure the network elements, as well as receive observations associated with features in the network elements. For example, DM observes and configures NEs, while NM observes and configures DM, as well as NE via DM.

By means of configuration via the DM, NM, and/or related interfaces, functions over the X2 and S1 interfaces can be carried out in a coordinated way throughout the RAN (Radio Access Network), eventually involving the Core Network, i.e. MME and S-GWs.

The physical layer transmission in LTE uses OFDM (Orthogonal Frequency-Division Multiplexing) in the downlink and DFT-spread (Discrete Fourier Transform spread) OFDM in the uplink. The basic LTE physical resource can thus be seen as a time-frequency grid as illustrated in FIG. 3, where each resource element corresponds to one subcarrier during one OFDM symbol interval.

In the time domain, LTE downlink transmissions are organized into radio frames of 10 ms (milliseconds), each radio frame consisting of ten equally-sized subframes of 1 ms as illustrated in FIG. 4. A subframe is divided into two slots, each of 0.5 ms time duration.

The resource allocation in LTE is described in terms of resource blocks (RB), also referred to as physical resource blocks or PRBs, where an RB corresponds to one slot in the time domain and 12 contiguous 15 kHz subcarriers in the frequency domain. Two in time consecutive RBs represent an RB pair and corresponds to the time interval upon which scheduling operates.

Transmissions in LTE are dynamically scheduled in each subframe where the base station (also referred to as eNodeB or eNB) transmits downlink assignments/uplink grants to certain UEs via the physical downlink control channel (PDCCH), or the enhanced PDCCH (EPDCCH) introduced in LTE Rel. 11. In LTE downlink, data is carried by the physical downlink shared channel (PDSCH) and in the uplink the corresponding link is referred to as the physical uplink shared channel (PUSCH). The PDCCHs are transmitted in the first OFDM symbol(s) in each subframe and spans (more or less) the whole system bandwidth, whereas EPDCCH is mapped on RBs within the same resource region as used for PDSCH. Hence, EPDCCHs are multiplexed in the frequency domain with the PDSCH and it may be allocated over the entire subframe. A UE that has decoded an assignment carried by a PDCCH, or EPDCCH, knows which resource elements in the subframe contain data aimed for the UE. Similarly, upon receiving an uplink grant, the UE knows upon which time/frequency resources it should transmit upon.

Demodulation of sent data requires estimation of the radio channel which is done using transmitted reference symbols (RS), i.e. symbols known by the receiver. In LTE, cell specific reference symbols (CRS) are transmitted in all downlink subframes and in addition to assisting downlink channel estimation, they are also used for mobility measurements performed by the UEs. LTE also supports UE specific RS, i.e. demodulation reference signals (DMRS), to assist channel estimation for demodulation purposes only and channel state information RS (CSI-RS) used for channel feedback purpose only.

FIG. 5 illustrates mapping of PDCCH and PDSCH and CRS on resource elements within an LTE downlink subframe. In this example, the PDCCHs occupy the first out of three possible OFDM symbols, so in this particular case the mapping of data carried by PDSCH could start already at the second OFDM symbol. Since the CRS is common to all UEs in the cell, the transmission of CRS cannot be easily adapted to suit the needs of a particular UE. This is in contrast to DMRS which means that each UE has reference signals of its own placed in the data region of FIG. 5 as part of PDSCH. In LTE, subframes can be configured as MBSFN (Multicast-broadcast single-frequency network) subframes which implies that CRSs are only present in the PDCCH control region.

The length of the PDCCH control region, which can vary on a subframe basis, is conveyed in the physical control format indicator channel (PCFICH). The PCFICH is transmitted within this control region, at locations known by UEs. After a UE has decoded the PCFICH, it thus knows the size of the control region and in which OFDM symbol the data transmission starts. The physical hybrid-ARQ indicator channel (PHICH) is also transmitted in the control region. This channel carries ACK/NACK responses to a UE to inform if the uplink data transmission in a previous subframe was successfully decoded by the base station or not.

In the black and white rendering of FIG. 5, the shading for cell specific RS blocks and control blocks may be difficult to distinguish. This figure shows the CRS for the case of four CRS ports at the eNB. The cell specific RS blocks are shown in the 2nd, 5th, 8th, 11th, and 14th rows (from the bottom to the top) of the 1st, 5th, 8th, and 12th columns (from the left to the right). The control blocks are shown in the 1st, 3rd, 4th, 6th, 7th, 9th, 10th, 12th, 13th, 15th, and 16th rows (from the bottom to the top) of the 1st column (from the left). The 2nd and 3rd columns (from the left) may be columns of control or data blocks depending on the length of the control region.

Interference mitigation on the transmitter side refers to methods that aim to coordinate the physical channel transmissions across cells to reduce/avoid severe interference. A simple example is when an aggressor base station occasionally mutes its transmissions on certain radio resources in order for a victim cell to schedule interference sensitive UEs on radio resources with reduced interference. LTE features to coordinate transmissions have been specified in the context of inter-cell interference coordination (ICIC) and coordinated multipoint transmissions (CoMP). In the case of ICIC, an eNB sends a message over the LTE inter-eNB interface X2 with coordination information that a receiving eNB can take into account when scheduling interference sensitive users. In the case of CoMP, a cluster of transmission points, or base stations, can jointly and synchronously transmit the same signals to a UE to increase the received power on the desired signals, or it can as in the ICIC case coordinate the transmissions to reduce/avoid inter-point interference.

Over the X2 interface, procedures have been defined to support exchange of information enabling interference coordination. One of such procedures is the X2 Load Indication procedure shown in FIG. 6.

The LOAD INFORMATION message carries a number of IEs related to load and utilization in the sending eNB's cell, Some of the information carried by this message are described below and specified in 3GPP TS 36.423 V12.0.0, "X2 Application Protocol," December 2013:

UL Overload Interference Indication (OII) indicates per RB the interference level (low, medium, high) experienced by the indicated cell on all RBs.

UL High Interference Indication (HII) indicates per RB the occurrence of high interference sensitivity, as seen from the sending eNB.

Received Narrow Transmit Power (RNTP) indicates per RB whether DL transmission power is lower than the value indicated by a threshold.

Almost Blank Subframe (ABS) pattern indicating the subframes the sending eNB will reduce power on some physical channels and/or reduced activity.

The X2 IEs OII, HII and RNTP were specified in LTE Rel. 8 and represent methods for coordinating physical data channel transmissions in the frequency domain across cells. The ABS IE, however, was specified in LTE Rel. 10 as a time domain mechanism to primarily protect reception of PDCCH, PHICH and PDSCH in the small cells by letting macro cells occasionally mute, or reduce transmit power on PDCCH/PDSCH in certain subframes. The eNB ensures backwards compatibility towards UEs by still transmitting necessary channels and signals in the ABS for acquiring system information and time synchronization.

In R1-141816, LS on Inter-eNB CoMP for LTE, Release 12, March 2014, 3GPP RAN1 agreed to base the Inter eNB CoMP solution on signaling of the following information over X2 in Rel-12 LTE:

One or more CoMP hypotheses, each comprising a hypothetical resource allocation associated with a cell ID, where the cell identified by the cell ID is not necessarily controlled by the receiving eNB
  How to react to a received CoMP hypothesis signaling is up to receiving eNB's implementation. E.g. accept or ignore, potentially sending a feedback, e.g. "yes/no" to the sending node.
  RAN1 guidance to RAN3 on necessary granularity and rate of CoMP hypothesis in time/frequency domain:
    Signaling period: RAN1's recommendation is 5, 10, 20, 40, 80 ms or aperiodic
      If aperiodic, a validity period for the information should be included
      RAN3 to specify the exact periodicities taking into account limitation of existing X2 interface
    Per RB with time granularity per cell
      Time granularity could be one or multiple subframe level
A benefit metric associated with one or more CoMP hypothesis/es, quantifying the benefit that a cell of the sender node expects in its scheduling when the associated CoMP hypothesis/es is assumed
  The range of benefit metric in the X2 message should be specified
  The method of deriving the cell-specific benefit metric is up to each eNB implementation
  RAN1 guidance to RAN3:
    Necessary time/frequency granularity and signaling period: Same as the associated CoMP hypothesis/es
RSRP measurement reports of one or more UEs
  RAN1 guidance to RAN3:
    Time domain granularity of the signaling: event triggered or periodic exchange, with periodicities 120, 240, 480, 640 ms.
      Mechanism to provide RSRP report upon request from an eNB should be made available
    Per cell in sending eNB identified by cell ID:
      Per UE identified by a UE ID, e.g. eNB-UE-X2-APID:
        One or more set(s) of {RSRP and cell ID} (maximum number of set(s) equals eight)
  Note: CoMP signaling needs to be associated with a carrier frequency identity.

The X2 interface, like the S1 interface, supports two types of procedures. They are defined in 3GPP TS 36.423 V12.0.0, "X2 Application Protocol," December 2013, as below:

Elementary Procedure: X2AP protocol consists of Elementary Procedures (EPs). An X2AP Elementary Procedure is a unit of interaction between two eNBs. An EP consists of an initiating message and possibly a response message. Two kinds of EPs are used:
  Class 1: Elementary Procedures with response (success or failure),
  Class 2: Elementary Procedures without response.

Class one procedures are typically used for functions that require confirmation from the receiving node of reception of a message and acknowledgement of an assumed behavior, or response with certain related information.

Class two procedures are typically used for functions where the sending node does not necessarily need to know of a behavior assumed by the receiving node and/or for functions where the information sent by the sending node have a limited life span and would require updating within a relatively short amount of time.

3GPP is currently working on support for Inter eNB CoMP for LTE with non Ideal Backhaul. An agreement has been taken in 3GPP to base solutions for Inter eNB CoMP on the use of the X2 interface and the new Rel-12 X2 signaling is described above. Accordingly, the continues to exist a need in the art for methods and devices providing improved interference mitigation.

SUMMARY

According to some embodiments of inventive concepts, a method of operating a base station in a radio access network (RAN) may be provided. In particular, a message may be communicated between the base station and another node of the radio access network, and the message may include a Coordinated Multipoint (CoMP) hypothesis field, a benefit metric field, and a cell identification field.

Accordingly, information regarding resource allocations may be communicated among nodes of a Radio Access Network, for example, to provide improved interference mitigation. Moreover, such communications may be used to transmit/receive a resource allocation mandate.

Communicating may include transmitting the message from the base station to the other node of the radio access network, and the message may include the Coordinated Multipoint (CoMP) hypothesis field, the benefit metric field, and the cell identification field.

The message may be a first message, and the CoMP hypothesis field may be a first CoMP hypothesis field including first CoMP hypothesis data that identifies downlink resources for interference protection. The cell identification field may be a first cell identification field that includes first cell identification data that identifies a cell to which the first CoMP hypothesis data applies. The benefit metric field may be a first benefit metric field that includes first benefit metric data that defines an effect on the first base station and/or on another node of the network associated with a resource allocation defined by the first CoMP hypothesis data. In addition, a second message may be transmitted from the base station to another node of the radio access network, and the second message may include a second Coordinated Multipoint (CoMP) hypothesis field including second CoMP hypothesis data, a second benefit metric field including second benefit metric data, and a second cell identification field including second cell identification data.

The base station may be a first base station, and the CoMP hypothesis field may include CoMP hypothesis data. The cell identification field may include cell identification data that identifies a cell served by a second base station, and the benefit metric field may include benefit metric data that identifies the CoMP hypothesis data as indicating a resource allocation that is mandated for the cell served by the second base station. The benefit metric data may identify the CoMP Hypothesis data as indicating the resource allocation that is mandated for the cell served by the second base station without considering a benefit to the first base station and/or other nodes of the network.

Communicating may include receiving the message at the base station from the other node of the radio access network, and the message may include the Coordinated Multipoint (CoMP) hypothesis field, the benefit metric field, and the cell identification field.

The message may be a first message, and the CoMP hypothesis field may be a first CoMP hypothesis field including first CoMP hypothesis data that identifies downlink resources for interference protection. The cell identification field may be a first cell identification field that includes first cell identification data that identifies a cell to which the CoMP hypothesis data applies, and the benefit metric field may be a first benefit metric field that includes first benefit metric data that defines an effect on another node of the network associated with a resource allocation defined by the first CoMP hypothesis data. A second message may be received from another node of the radio access network, and the second message may include a second Coordinated Multipoint (CoMP) hypothesis field including second CoMP hypothesis data, a second benefit metric field including second benefit metric data, and a second cell identification field including second cell identification data.

The CoMP hypothesis field may include CoMP hypothesis data, and the cell identification field may include cell identification data that identifies a cell served by the base station. Moreover, the benefit metric field may include benefit metric data that identifies the CoMP hypothesis data as indicating a resource allocation that is mandated for the cell served by the base station. The benefit metric data may identify the CoMP Hypothesis data as indicating the resource allocation that is mandated for the cell served by the base station without considering a benefit to another base station and/or another node/nodes of the network.

According to some other embodiments of inventive concepts, a base station of a radio access network may be adapted to communicate a message between the base station and another node of the radio access network. More particularly, the message may include a Coordinated Multipoint (CoMP) hypothesis field, a benefit metric field, and a cell identification field.

According to still other embodiments of inventive concepts, a base station of a radio access network may include a transceiver configured to provide radio communications with a plurality of wireless terminals, a network interface configured to provide communications with other base stations of the radio access network, and a processor coupled to the transceiver and the network interface. More particularly, the processor may be adapted to communicate a message through the network interface between the base station and another node of the radio access network, with the message including a Coordinated Multipoint (CoMP) hypothesis field, a benefit metric field, and a cell identification field.

BRIEF DESCRIPTION OF THE DRAWINGS

FIGS. 9A and 9B provide a table illustrating an example a Load Information message according to some embodiments of inventive concepts.

FIGS. 10A and 10B provide a table illustrating an example of IE encoding in a Load Information message according to some embodiments of inventive concepts.

FIGS. 13A and 13B provide a table illustrating an example of Load Information enhancements according to some embodiments of inventive concepts.

FIGS. 14A and 14B provide a table illustrating an example of Load Information message IE encoding according to some embodiments of inventive concepts.

FIGS. 15A and 15B provide a table illustrating CH and BM encoding according to some embodiments of inventive concepts.

FIGS. 18-20 are flow charts illustrating operations of base stations according to some embodiments of inventive concepts.

DETAILED DESCRIPTION

Figure 1:
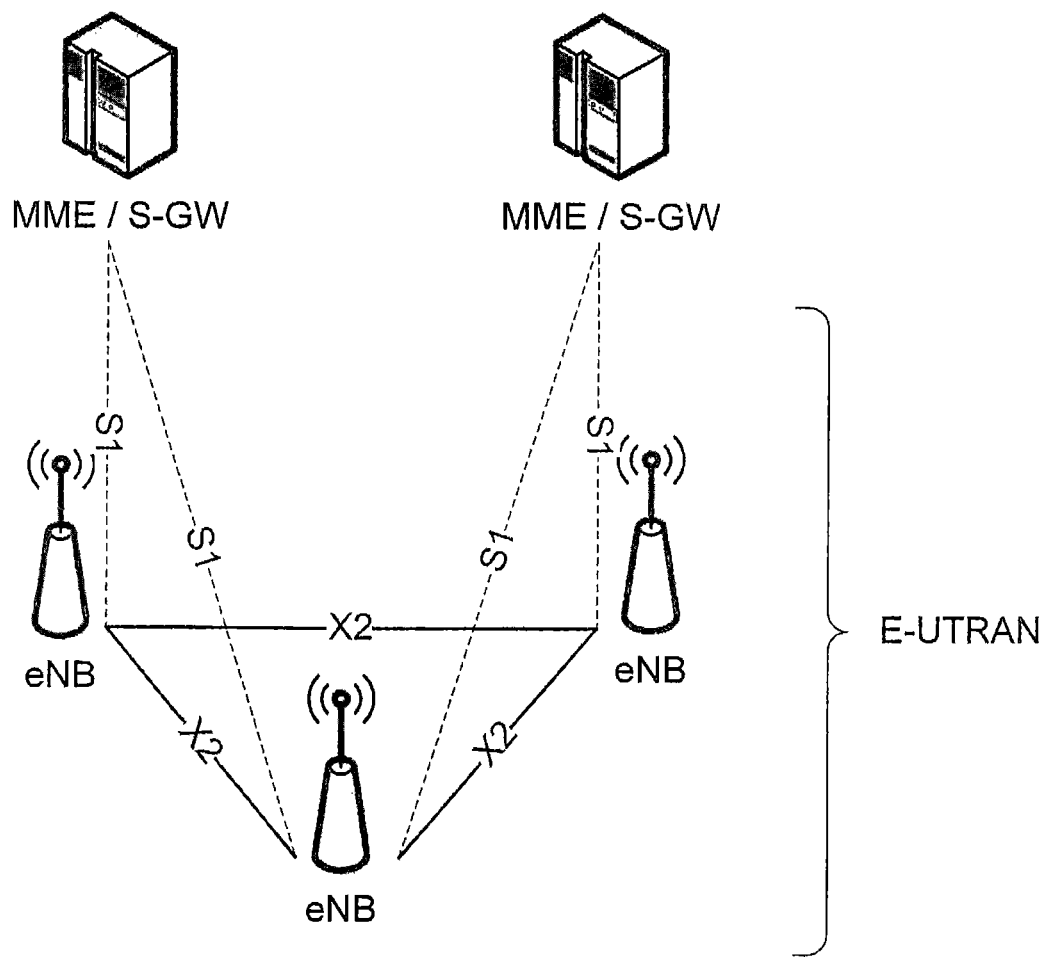
FIG. 1 is a schematic diagram illustrating LTE architectures with X2 logical interfaces between base stations eNBs and with S1 logical interfaces between base stations eNBs and MME/S-GW.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN that communicates over radio communication channels with wireless terminals (also referred to as UEs). It will be understood, however, that inventive concepts are not limited to such embodiments and may be embodied generally in any type of communication network. As used herein, a legacy or non-legacy wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

Note that although terminology from 3GPP (3rd Generation Partnership Project) LTE (Long Term Evolution) has been used in this disclosure to provide examples embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station) and UE (also referred to as a wireless terminal) should be considered non-limiting and does not imply a certain hierarchical relation between the two. In general, "eNodeB" could be considered as a first device and "UE" could be considered as a second device, and these two devices may communicate with each other over some radio channel. Similarly, when talking about signaling over an X2 backhaul, inventive concepts are not limited to communication between eNBs, but the communicating nodes can be any nodes terminating the backhaul interface over which the information described is transmitted.

Providing Inter eNB CoMP signaling with a non Ideal Backhaul based on only the existing X2 signaling and the new X2 signaling listed above may be difficult. Reducing/minimizing signaling between eNBs may be desired without impact and/or with reduced impact due to variation of backhaul delays and/or jitter, and while maintaining resilience to packet losses.

Reduction/avoidance of misuse in the signaling may be desired, in the sense that a first node is requesting a second node to unnecessarily mute too many resources, at the benefit of the first node only.

Information in an RNTP (Relative Narrowband Transmit Power) IE (Information Element) may not be refreshed when a new RNTP IE is received, but it may be refreshed on a per RNTP Threshold IE basis. Namely, more than one RNTP IEs can be used between two peer nodes connected via X2 RNTP IE. Hence, the RNTP IE with a specific RNTP Threshold IE may be refreshed only when a new RNTP IE with the same RNTP Threshold IE is received. This may allow also for exchanging and/or storing of scheduling information with higher granularity than in prior art.

In some embodiments of inventive concepts, the RSRP Measurement List is used to determine the interference protection level and scheduling policies for eCoMP cluster coordination. These can be used by the receiving node to evaluate the real benefit, need for interference protection, and/or level of mitigation to be applied, and/or to reduce/avoid misuse of the CoMP hypothesis signaling. An example may be to use the RSRP (Reference Signal Received Power) measurements to normalize the benefit metric IEs received.

Some embodiments of inventive concepts may: provide coordination using existing and new signaling over X2 interfaces to improve system performance and user throughput performance; provide ways to detect misuse of X2 signaling which could create instability in the coordination between nodes; provide support of Inter eNB CoMP with non Ideal Backhaul both in distributed and centralized schemes; provide reduction/minimization of signaling between involved nodes and/or provide flexibility to either empower one or a few nodes with the role of coordinator, and/or to allow each node to behave independently from neighbors; and/or provide a self converging system where UEs in need of interference mitigation could be addressed and performance could be improved.

Embodiments of inventive concepts may include signaling mechanisms to enable support of Inter eNB CoMP in a distributed architecture and/or in a centralized architecture.

Embodiments of inventive concepts may use an X2 interface procedure not involving a response message, also known as a Class 2 procedure. The latter may reduce the amount of signaling and/or may leave freedom to each node on when to trigger signaling of information without the need for a receiving node to follow a behavior suggested by the sender, i.e. maintaining the peer to peer nature of the X2 interface.

It shall be noted that the same methods can also be enabled with procedures involving a response message, i.e. Class 1. In the case of adoption of a Class 1 procedure between node 1 and node 2, the response message from node 2 to node 1 may carry part or all of the information that would otherwise be sent via a single class two message according to the methods described in embodiments of inventive concepts.

The RNTP IE is currently used in X2 signaling for DL (DownLink) interference coordination. Hence the use of such an IE for Inter eNB resource allocation coordination is in line with design principles of this IE.

The standard in 3GPP TS 36.423 V12.0.0, "X2 Application Protocol," December 2013, currently quotes the following regarding reception of the RNTP information: "If the Relative Narrowband Tx Power (RNTP) IE (Information Element) is received in the LOAD INFORMATION message, it indicates, per PRB (Physical Resource Block or Resource Block), whether downlink transmission power is lower than the value indicated by the RNTP Threshold IE. The receiving eNB may take such information into account when setting its scheduling policy and shall consider the received Relative Narrowband Tx Power (RNTP) IE value valid until reception of a new LOAD INFORMATION message carrying an update."

In some embodiments of inventive concepts using RNTP, the information in the RNTP IE may not be refreshed when a new RNTP IE is received, but it may be refreshed on a per RNTP Threshold IE basis. Namely, more than one RNTP IEs can be used between two peer nodes connected via X2, and in the particular case of centralized schemes, more than one RNTP IE can be used in an eCoMP neighborhood.

As an example, in the RNTP IE one RNTP Threshold IE and consequent associated RNTP Per PRB IE may be used for legacy DL coordination functions and another set of such parameters, established either per eCoMP cluster or per peer to peer X2 connection, for eCoMP. Hence, the RNTP IE with a specific RNTP Threshold IE may be refreshed only when a new RNTP IE with the same RNTP Threshold IE is received. The latter would allow also for exchanging and storing of scheduling information with higher granularity.

According to the latter method, the RNTP IE becomes a tool to control coordinated scheduling in an eCoMP cluster. As the need for interference protection of each node in the cluster changes, the latter being highlighted by CoMP Hypothesis, Benefit Metric and RSRP Measurement List, a central coordinator can recommend to different nodes in the cluster a new RNTP IE where the at least RNTP Threshold IE is considered as a new maximum transmission power for the resources in need of protection.

In some other embodiments using RNTP, the technique of RNTP embodiments discussed above are used in a distributed scheme (i.e., without central coordinator), where nodes can send a new RNTP IE to their peers with the purpose of recommending at least a new RNTP Threshold IE to the receiving node. The latter can, for example, be achieved by providing a dummy value for the RNTP Per PRB IE, which signifies that only the RNTP Threshold IE should be considered as a recommendation of the maximum power to be used in interference protected resources. Alternatively or in combination, the RNTP threshold could affect the meaning of CoMP hypothesis IE. For example, it could be used to set the maximum power assumed for resources considered used in the hypothetical resource allocation. Another option is to use the RNTP threshold to set the maximum power level for the resources considered not to be used.

When transmitting an RNTP IE, one of a set of RNTP per PRB values is assigned to the RNTP per PRB for the RNTP IE. Each of a subset of the set of RNTP per PRB values defines respective resource blocks on a physical resource block basis for which downlink transmission is below a downlink transmission power threshold and/or physical resource blocks for which downlink transmission power is above a downlink transmission power threshold. The dummy value (discussed above) is used to signify that the RNTP Threshold IE should be considered as a recommendation of the maximum power to be used in interference protected resources, and the dummy value is included in the set of values assigned to the RNTP per PRB for an RNTP IE and excluded from the subset of values defining resource blocks.

A generalization of such use of the RNTP IE could be made with regards to any resource that should be protected from interference. For example, such use of the RNTP, with an opportunely set value of the RNTP Threshold IE, could be made in combination with Almost Blank Subframes (ABS), where the recommended RNTP Threshold IE would signify the maximum transmission power in ABS subframes.

Misuse of signaling may be detected using RSRP by implementation. In other embodiments of inventive concepts, the RSRP Measurement List can be used to better determine the interference protection level and scheduling policies for eCoMP cluster coordination. Hence, the RSRP measurement list can be used in a receiving node to detect misuse of X2 signaling from the sending node (for instance, if the sending node requests unnecessary muting of too many resources in the receiving node by the CoMP hypothesis IE) leading to unfairness in the system and/or system instability.

Indeed, the RSRP Measurement List may provide measurements collected by UEs in cells associated to different eNBs. Hence, the way in which these measurements are determined may be consistent (i.e., it may follow precise rules stated by the standard) for all nodes involved in the eCoMP cluster. On the contrary, the way CoMP Hypothesis and Benefit Metric are determined may be node specific. For example, derivation of such parameters could be vendor or implementation specific. Therefore, the RSRP Measurement List can be used by the receiving node to detect signaling misuse, evaluate the real benefit, evaluate a need for interference protection, and/or evaluate a level of mitigation to be applied.

As an example of an RSRP embodiment, an eNB could indicate to a peer eNB or to a central coordinator a high benefit associated to a given CoMP Hypothesis. However, the RSRP Measurement List could reveal that the level of interference caused by cells served by the receiving eNB is relatively low (or at least lower than that indicated by the Benefit Metric that was received). Hence, the level of interference mitigation to be provided by the receiving node may be relatively low (e.g., a small transmission power reduction may be sufficient) because the major cause of interference may reside in emissions from a different node. Stated in other words, the receiving node may chose to provide a transmission power reduction that is less than that indicated by the received CoMP Hypothesis if the received RSRP Measurement List indicates a potential reduction in interference that is less than that indicated by the Benefit Metric.

In general, the RSRP Measurement List can be used to check that the evaluation made by the sending node in determining CoMP Hypothesis and Benefit Metric is correct, i.e. the receiving node may decide to give a higher or lower weight (and eventually to ignore) to the request for interference mitigation in resources indicated in CoMP Hypothesis and Benefit Metric by means of analyzing the RSRP measurements.

As an example of another RSRP embodiment, the RSRP Measurement List may be used as a tool to normalize different Benefit Metric IEs received from different eNodeBs (base stations). As discussed above, determining values for the Benefit Metric may be implementation and/or vendor specific. For example, two eNBs indicating the same or similar CoMP Hypothesis and Benefit Metric may in fact experience different levels of interference and be subject to different benefits in case interference mitigation takes place, or different eNBs subject to the same levels of interference may generate different CoMP Hypotheses and Benefit Metrics. These differences may be exposed by analyzing the RSRP Measurement List. Different nodes declaring similar or same CoMP Hypotheses and Benefit Metrics may send different RSRP Measurement Lists. Hence, RSRP Measurements from the different eNBs can thus be used to determine a baseline benefit value for the Benefit Metric and to normalize received benefit metrics using associated RSRP Measurement Lists.

Inventive concepts may be divided into embodiments covering distributed architectures and embodiments covering centralized architectures for inter eNB CoMP, also referred to as eCoMP herein.

Figure 7:
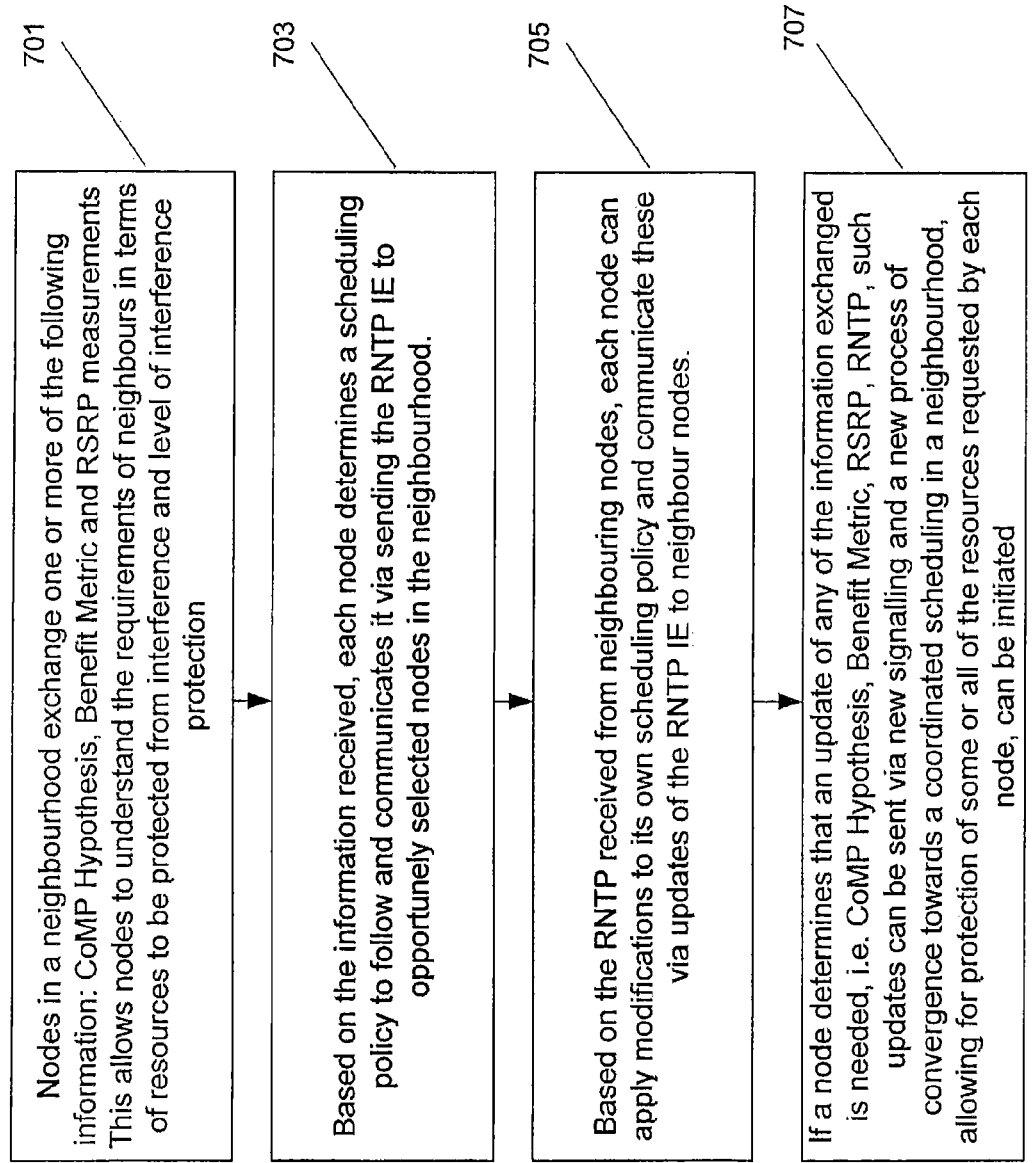
FIG. 7 is a flow chart illustrating operations covering distributed architectures according to some embodiments of inventive concepts.

Embodiments of distributed coordination implementation in distributed architectures will now be discussed with reference to the flow chart of FIG. 7.

A mesh network of peer nodes can be referred to as a distributed architecture. As an example, such nodes can be assumed to be eNBs. These are operations used for distributed coordination:

In a first, informative phase of the method at block 701, each eNB sends to other neighbor eNBs a CoMP Hypothesis, Benefit Metric and RSRP Measurements. This allows receiving eNBs to understand the interference protection desired by the sending eNB and the level of protection needed.

In a second, reactive phase of the method at block 703, each eNB sends an RNTP IE to other neighbor eNBs. The RNTP provides information about the resource allocation adopted by the sending eNB, i.e. the scheduling derived by the sending eNB from the exchange of information with other neighbor eNBs carried out in the first phase of the method.

Upon receiving RNTP IEs from neighbor nodes, a node can evaluate whether to modify its own scheduling policies for the sake of achieving a better coordination with other nodes. At block 705, each node can apply modifications to its own scheduling policy and communicate these via updates of the RNTP to neighbor nodes based on the RNTP received from neighboring nodes. For example, if all nodes in a neighborhood are using very low transmission power on one resource block, a node might decide to increase utilization of such resource block and reduce utilization of other resource blocks that are more heavily utilized in the neighborhood.

In an update phase of the method at block 707, eNBs can update the information previously exchanged with new instances of the signaling. For example, if RSRP measurements change or in general an eNB deems necessary to send new instances of such measurements, a new message can be sent to opportunely selected neighbors, including RSRP measurements. Similarly, if the eNB conditions (such as load demand, number of UEs served, UEs geometries, etc.) imply a change in the scheduling policy, a new RNTP IE can be signaled to neighbor eNBs. Further, if the interference condition of an eNB changes and it is derived that a new pattern of interference protected resources should be signaled to neighbor eNBs, a new message with an update of CoMP Hypothesis and Benefit Metric can be sent.

Combining in the same message one or more of the information above can be carried out by the eNB. General principles of this class of embodiments of distributed architecture are illustrated in the flow chart of FIG. 7.

In this embodiment, eNBs use a peer to peer interface such as the X2 interface to exchange information via a Class 2 procedure, namely a procedure made of a single message from sender to receiver and not requiring a response message. As an example the LOAD INFORMATION message can be considered as an example for this embodiment. Some embodiments include exchanging to following information via the Class 2 procedure:

CoMP Hypothesis IE: When used in distributed architectures (i.e. for peer to peer eNB signaling) this IE communicates to a node that there could be a hypothetical benefit (indicated by the Benefit Metric IE discussed below) for the UEs served by the sending eNB if DL interference is reduced on certain resources given by a hypothetical resource allocation identified/suggested in the CoMP Hypothesis IE Benefit Metric IE: This IE is an indication of hypothetical benefits that the sending node's UEs may gain if the receiving eNB adopts the resource allocation policy suggested in the CoMP Hypothesis IE List of RSRP measurements IE: The RSRP measurements may be used to infer the interference and channel conditions of UEs in need of interference-protected resources. Namely, RSRP measurements can be provided for UEs monitoring different cells such as serving and neighbor cells. The receiving eNB may use signal strengths of such monitored cells to provide an independent understanding of UE interference and channel conditions for the sending eNB.

RNTP IE: This IE is already defined in the specifications defining the X2 interface and is described as in 3GPP TS 36.423 V12.0.0, "X2 Application Protocol," December 2013: "This IE provides an indication on DL power restriction per PRB in a cell and other information needed by a neighbor eNB for interference aware scheduling"

Figure 8:
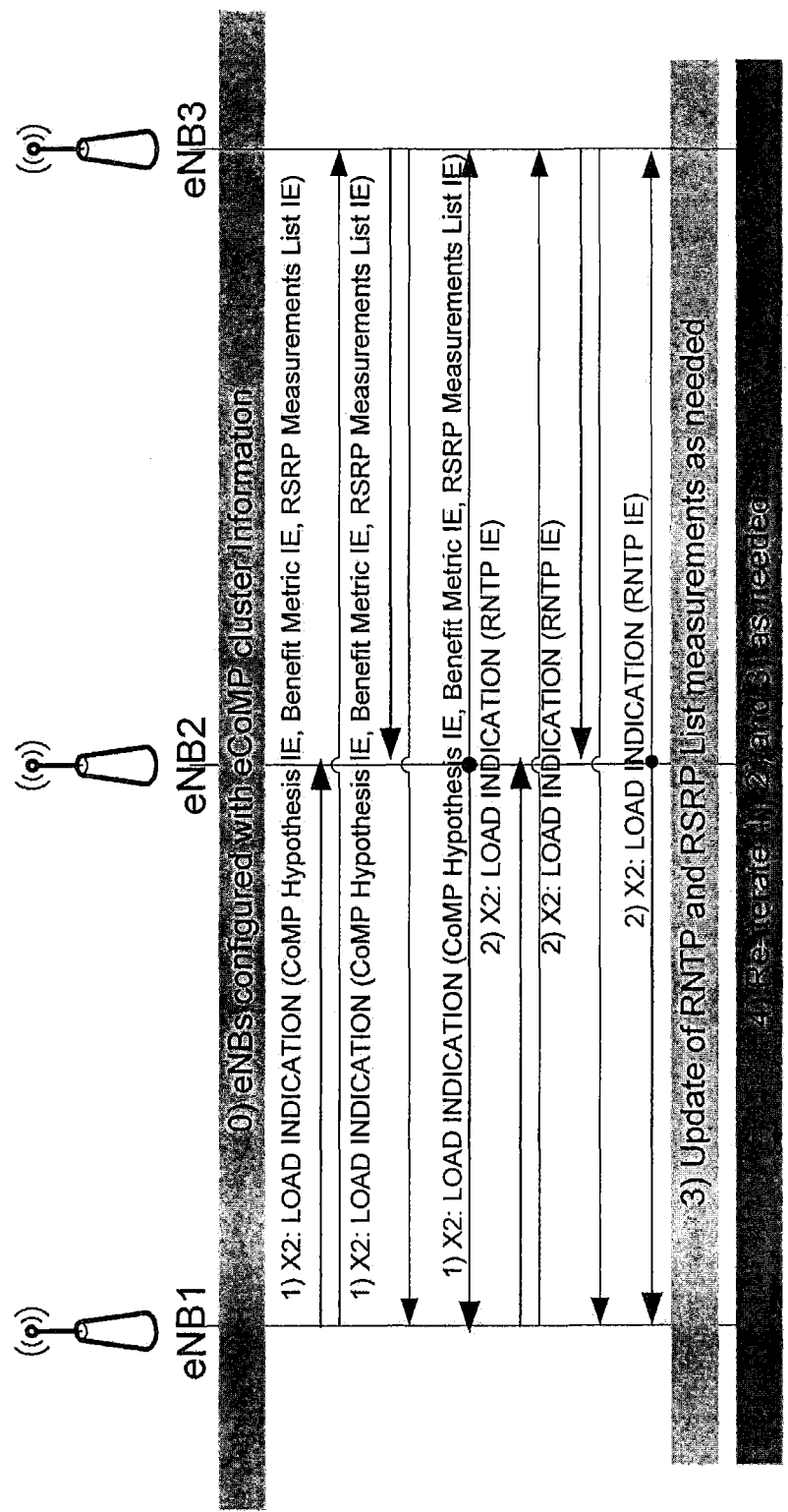
FIG. 8 is a message diagram illustrating examples of X2 based distribution for inter base station CoMP according to some embodiments of inventive concepts.

In this embodiment, a signaling solution is shown as an example in FIG. 8 using an X2 based distribution solution for inter eNB CoMP.

In the example of FIG. 8, the following operations can be described:

Operation 0. eNBs belonging to an Inter eNB CoMP cluster are configured with information about neighboring eNBs in the same cluster.

Note: such configuration may be omitted if cluster members are inferred by presence of Inter eNB CoMP specific IEs in LOAD INFORMATION message Operation 1. For each eNB1-eNB2 pair in an Inter eNB CoMP cluster, eNB1 sends an X2:LOAD INDICATION message (also referred to as a Load Information message) to eNB2 including CoMP Hypothesis IE, Benefit Metric IE and RSRP IE. The CoMP Hypothesis IE indicates the resources requested by eNB1 as DL interference protected. The Benefit Metric IE indicates the hypothetical benefit eNB1 would receive if such resources were interference protected. The RSRP Measurements List IE indicates the RSRP measurement on cells detected by UEs in need of interference protection: such measurements provide an indication of the power reduction to be performed by receiving eNB on the resources indicated in the CoMP Hypothesis IE and of the interference received by affected UEs.

Operation 2. Based on the information received in step 1, and for each eNB1-eNB2 pair in an eCoMP cluster, eNB2 sends an X2:LOAD INDICATION message to eNB1 with an RNTP IE indicating the resource allocation followed by eNB2. The RNTP Threshold IE may be chosen for eCoMP purposes (e.g. derived from RSRP Measurements List IE and Benefit Metric IE received)

Operation 3. If an eNB in an eCoMP cluster realizes that RSRP measurements of served UEs have changed and that an update of such measurements towards other eNBs in the cluster is opportune, a new X2:LOAD INDICATION message containing an update of the RSRP Measurements List IE is sent. Likewise, if an eNB in an eCoMP cluster realizes that changes to its scheduling policies need to be applied, e.g. due to better coordination with other neighboring eNBs or due to changing load demand, UE channel conditions and similar factors, a new RNTP IE can be sent in an X2: LOAD INFORMATION message to neighbor eNBs.

Operation 4. If an eNB in an eCoMP cluster realizes there is the need of changes to the resources indicated in the CoMP Hypothesis IE and eventually Benefit Metric IE, or to the resource allocation policy indicated by the RNTP IE, such changes can be signaled with new X2: LOADINDICATION messages Operation 5. As an example, the following figure shows the changes to be made in the LOAD INFORMATION message.

As an example of how the IEs mentioned in the embodiment above can be added in the LOAD INFORMATION message, or in general in any new or existing message, FIGS. 9A and 9B illustrate an example of a tabular representation of such information.

As it can be seen, the RSRP measurements list may not be associated with a cell in the sending eNB, but it might simply state the RSRP value recorded for a cell defined by its E-CGI (Enhanced Global Cell Identity) and measured by a UE defined by a temporary UE identified, for example, in the form of the eNB-UE-X2AP-ID already defined in 3GPP TS 36.423 V12.0.0, "X2 Application Protocol," December 2013. The identifier could identify UEs that are either active or Idle at the moment of signaling. It is worth noting that by using an identifier such as the eNB-UE-X2AP-ID, which is only used to identify a UE over the X2 backhaul interface (and not to identify the UE over the air interface) it is possible to avoid "freezing" over the air identifiers for the purpose of X2 backhaul signaling. Indeed, over the air identifiers are used in much higher numbers and frequency and their shortage may imply issues with UE connection over the air interface.

Likewise, the CoMP Hypothesis IE and Benefit Metric IE may be identified as referring to a source cell, but they could also be provided in a serving cell independent way (i.e., they might indicate the resources in need of interference protection and the associated benefit for the whole eNB).

Another embodiment of encoding the IEs in an X2 Class 2 Load Information message is provided in FIGS. 10A and 10B. The difference in this example is that in case the Inter eNB Coordination Info IE is present the CoMP Hypothesis and Benefit Metric are both mandatory IEs. This is beneficial in cases where a Benefit Metric is always associated with a CoMP Hypothesis, in order to provide an estimate of benefit for the sending or the receiving node in case the resource allocation recommended with the CoMP Hypothesis and eventually detailed by information in the RNTP IE is followed.

Another detail of embodiments provided in FIGS. 10A and 10B is that the RSRP Measurement List is associated with a cell. Namely, this list constitutes measurements collected by UEs served by the cell identified by the Cell ID in the Cell Information Item IE. Each measurement is then associated with a cell ID, which includes the cell measured by the UE.

Embodiments on centralized coordination implementation will now be discussed.

In these embodiments, a centralized architecture is considered where a group of nodes, for example eNBs, is supported by a central node (e.g., a central eNB) that helps coordination of scheduling with the purpose of achieving interference mitigation for the UEs in need of interference protection served by nodes in the neighborhood.

In a first phase of the method, each node in the coordinated neighborhood signals to the central coordinator a CoMP Hypothesis, a Benefit Metric and RSRP measurements. Such information is meant to indicate to the centralized coordinator the protected resources and estimated benefit as desired by the sending eNB. Additionally, the RSRP measurements provide the centralized coordinator with an indication of the channel condition of the UEs in need of interference protection.

In a second phase of the method, the central coordinator provides each node in the neighborhood with a CoMP hypothesis indicating the resource allocation, i.e. scheduling, to follow in order to achieve a configuration providing interference mitigation benefits to all nodes in the neighborhood. The central coordinator may include in the message containing the CoMP Hypothesis an RNTP IE, where the only information to be considered by the receiving node is the RNTP threshold. Therefore, the signaling from the central coordinator will inform the receiving node about the set of resources to protect in terms of interference and a maximum transmission power for such set of resources.

In a third phase of the method, nodes involved in the procedure may signal to the central coordinator an RNTP IE indicating the scheduling policy adopted. Nodes can also signal the RNTP IE between each other, in order to directly inform neighboring nodes of the scheduling policy adopted and therefore allow better scheduling and resource allocation while maintaining interference mitigation.

As a consequence of receiving the RNTP IE, the central coordinator may decide to send to one or more eNBs a new RNTP IE indicating a modified RNTP threshold or it may decide to send a new CoMP Hypothesis, indicating a new set of resources in need of interference mitigation.

In a third phase of the method, eNBs can update the information previously sent to the central coordinator with new instances of the signaling. For example, if RSRP measurements change, or in general, if an eNB deems it useful/necessary to send new instances of such measurements, a new message can be sent to the central coordinator, including RSRP measurements. Similarly, if the eNB conditions (such as load demand, number of UEs served, UEs geometries, etc.) imply a change in the scheduling policy, a new RNTP can be signaled to the central coordinator and/or neighbor eNBs. Further, if the interference condition of an eNB changes and it is determined that a new pattern of interference protected resources should be signaled to the central coordinator, a new message with an update of CoMP Hypothesis and Benefit Metric can be sent. The central coordinator can react to such updates with a new indication of CoMP Hypothesis and RNTP threshold to opportunely selected nodes. Combining in the same message one or more of the information elements identified above can be carried out by the eNBs and central coordinator.

The information elements signaled over X2 could/should be used for centralized coordination schemes and this information may now be interpreted as follows:

CoMP Hypothesis IE: When used in centralized architectures (i.e., for centrally coordinated scheduling) this IE communicates to the central coordinator that there could be a hypothetical benefit (indicated by the Benefit Metric IE discussed below) for the UEs served by the sending eNB if DL (DownLink) interference is reduced on certain resources given by an hypothetical resource allocation that is identified by the CoMP Hypothesis IE. If the IE is sent from the central coordinator to eNBs in an eCoMP cluster, this IE represents a resource allocation configuration, which might not necessarily need to be associated to a Benefit Metric IE.

Benefit Metric IE: This IE is an indication of hypothetical benefits that the sending node's UEs may gain if neighboring eNBs adopt the resource allocation policy suggested in the CoMP Hypothesis IE List of RSRP measurements IE: The RSRP measurements are used/needed to infer the interference and channel conditions of UEs in need of interference-protected resources. Namely, RSRP measurements can be provided for UEs monitoring different cells such as serving and neighbor cells. Comparing signal strengths of such monitored cells provides an understanding of the UE interference and channel conditions for UEs communicating with the sending eNB.

Figure 11:
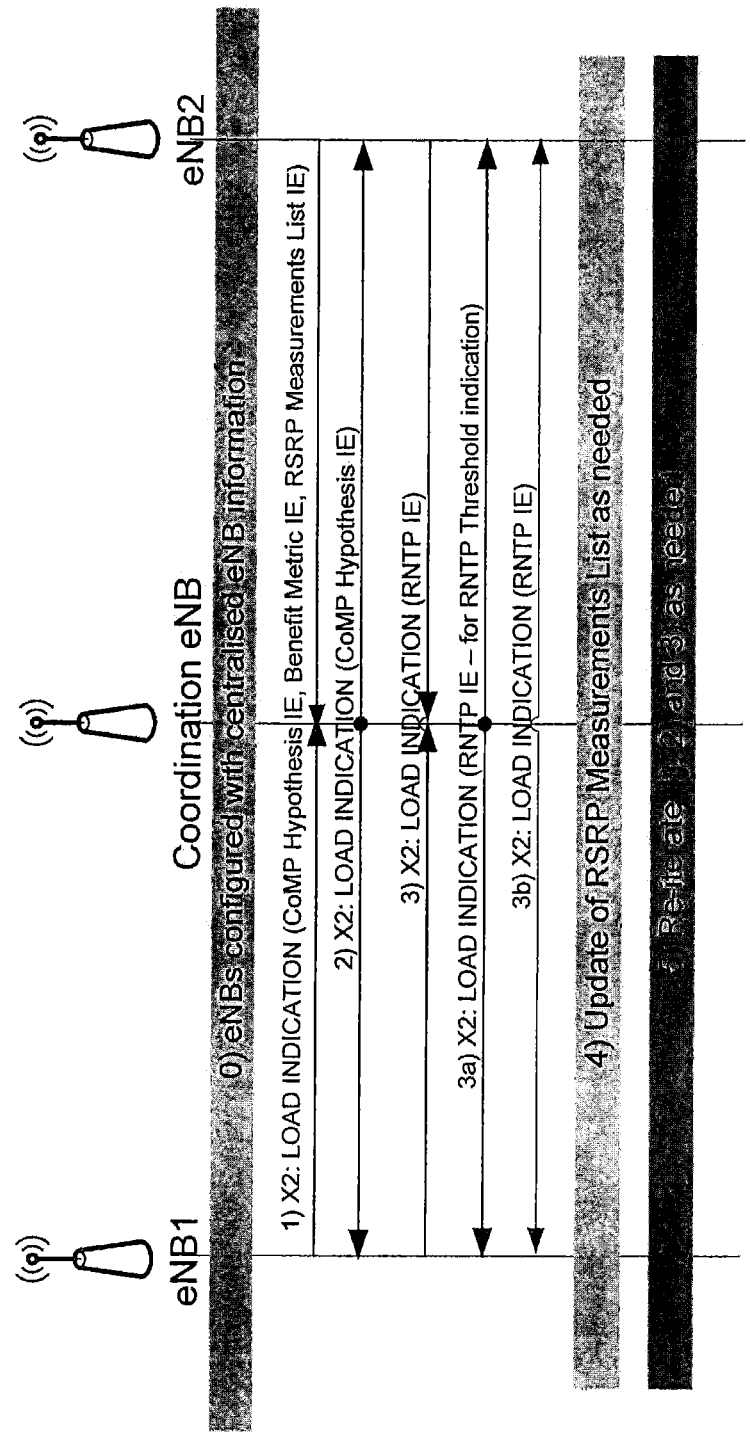
FIG. 11 is a message diagram illustrating examples of X2 based signaling in centralized architectures according to some embodiments of inventive concepts.

RNTP IE: This IE is already defined in the specifications defining the X2 interface and is described as in 3GPP TS 36.423 V12.0.0, "X2 Application Protocol," December 2013: "This IE provides an indication on DL power restriction per PRB in a cell and other information needed by a neighbor eNB for interference aware scheduling". When sent from a coordination node, this IE is used to adjust the RNTP Threshold IE used by the receiving eNB when adopting interference mitigation policies, namely to determine the maximum transmission power for the resources that should have reduced interference Assuming that one of the eNBs in FIG. 8 is a coordination eNB connected to other eNBs via the X2 interface, FIG. 11 shows how the X2 based signaling procedures proposed in this embodiment can adapt to such central coordination scheme. The following operations are involved in the example of FIG. 11:

Operation 0. eNBs belonging to an eCoMP cluster are configured with Coordination eNB information for the cluster.

Operation 1. eNB1 sends an X2:LOAD INDICATION message to Coordination eNB2 including CoMP Hypothesis IE, Benefit Metric IE, and RSRP IE. The CoMP Hypothesis IE indicates the hypothetical resources eNB1 would like to be DL interference protected. The Benefit Metric IE indicates the hypothetical benefit eNB1 would receive if such resources were interference protected. The RSRP IE indicates the RSRP measurement on cells detected by UEs in need of interference protection: such optional measurements provide an indication of the interference received by affected UEs.

Operation 2. Coordination eNB sends an X2:LOAD INDICATION message to each eNB in the cluster, indicating the CoMP Hypothesis, possibly indicating the Benefit Metric and optionally indicating the RNTP Threshold IE in an RNTP IE for which only the RNTP Threshold IE should be considered, that each eNB should follow (i.e. the hypothetical resource allocation scheme to follow). Note that the Benefit Metric sent by the central coordinator to eNBs may consist of the benefit for the receiving eNB in following the suggested resource allocation policy indicated by CoMP Hypothesis and possibly RNTP Operation 3. In order to indicate and modify the hypothetical resource allocation scheme of eNBs in the eCoMP cluster the following is possible:

Operation 3a) eNBs send an X2:LOAD INFORMATION message with the RNTP IE to the Coordination eNB. This indicates the resource allocation followed by each eNB.

Operation 3b) The Coordination eNB may send to eNBs in the cluster an X2:LOAD INFORMATION message including an RNTP IE with the only purpose of updating the RNTP threshold used by the receiving eNB (i.e. the RNTP per PRB IE and other IEs except for RNTP Threshold IE shall be ignored).

Operation 3c) Each eNB in the cluster may send an X2:LOAD INDICATION message including the RNTP IE to peer eNBs in the cluster in order to allow for further scheduling improvement/optimization.

Operation 4. If an eNB in an eCoMP cluster realizes that RSRP measurements of served UEs have changed and that an update of such measurements towards the Coordination eNB or other eNBs in the cluster is opportune, a new X2:LOAD INDICATION message containing an update of the RSRP Measurements List IE is sent.

Operation 5. If an eNB in an eCoMP cluster realizes there is a use/need of change to the resources indicated in the CoMP Hypothesis IE and eventually Benefit Metric IE, such changes can be signaled to the Coordination eNB with a new X2: LOAD INDICATION message(s).

Figure 12:
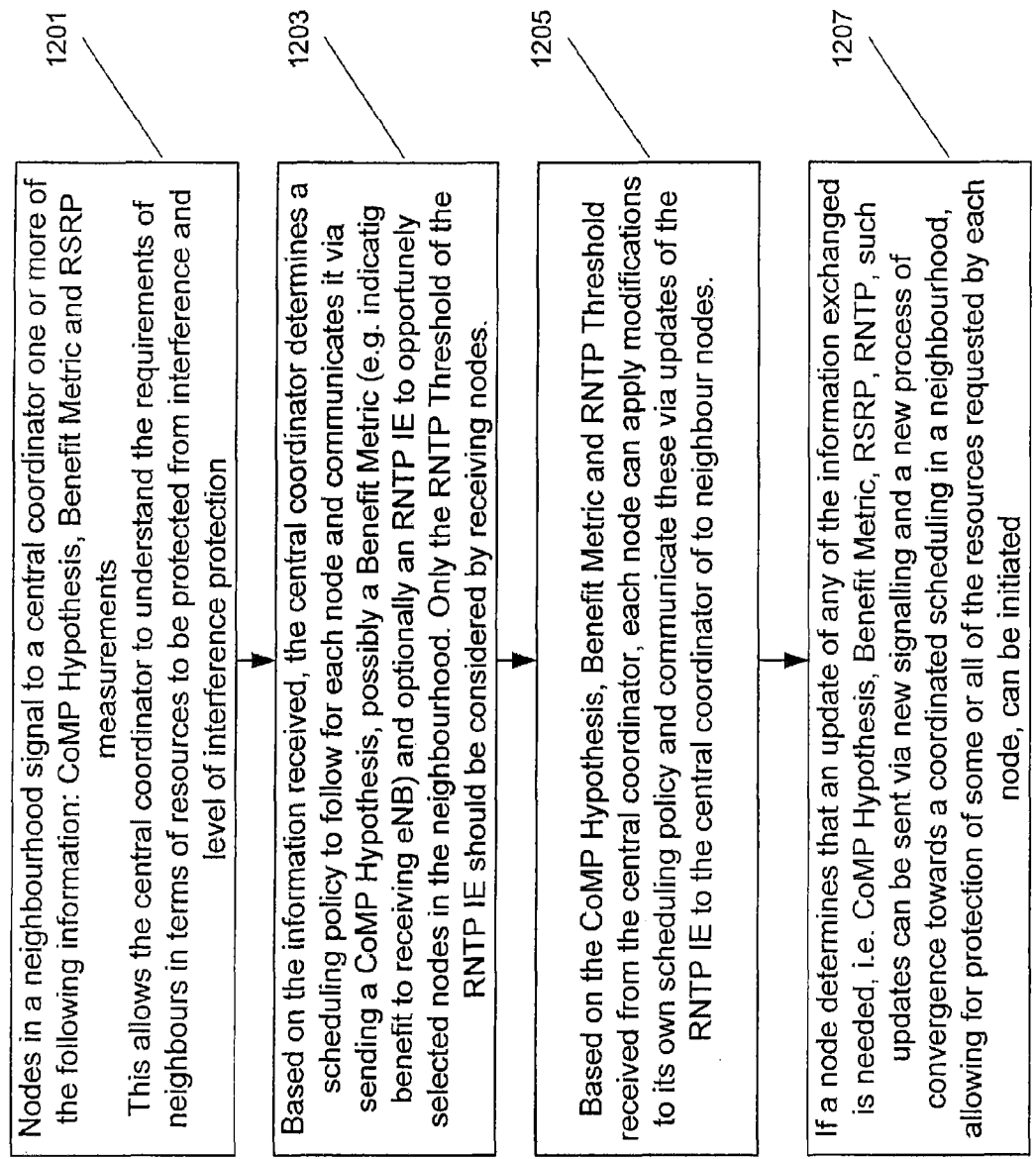
FIG. 12 is a flow chart illustrating operations covering centralized architectures according to some embodiments of inventive concepts.

General principles of this class of embodiments on centralized architecture are illustrated in the flow chart of FIG. 12.

Embodiments of combined distributed and centralized implementation will now be discussed.

Any combination of embodiments/methods/operations described above may/should be considered as possible. In a third embodiment, for example, nodes are first coordinated using a central coordination according to the second embodiments and thereafter, nodes exchange information directly between each other to fine tune interference coordination and keep track of parameter changes at neighbor nodes.

Figure 2:
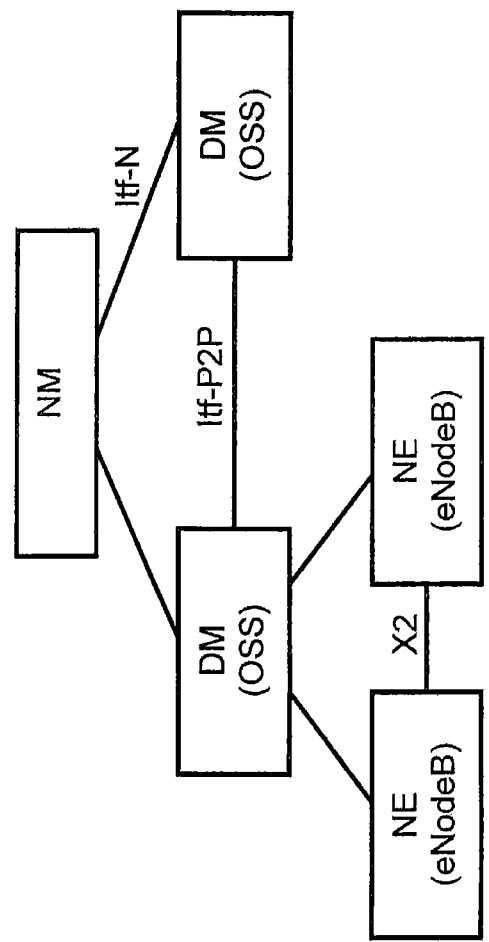
FIG. 2 is a block diagram illustrating a management system architecture an LTE system.
Figure 3:
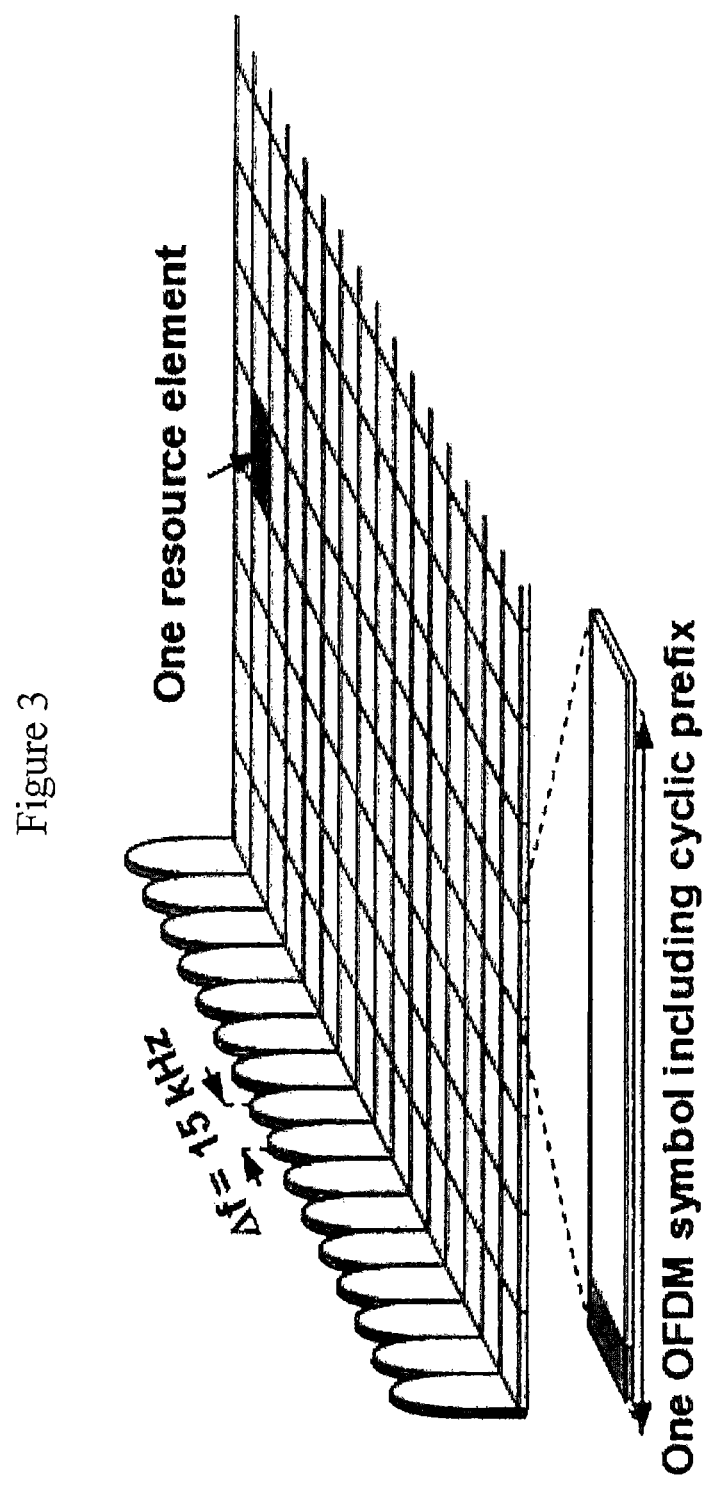
FIG. 3 is a diagram illustrating an LTE downlink physical resource.
Figure 4:
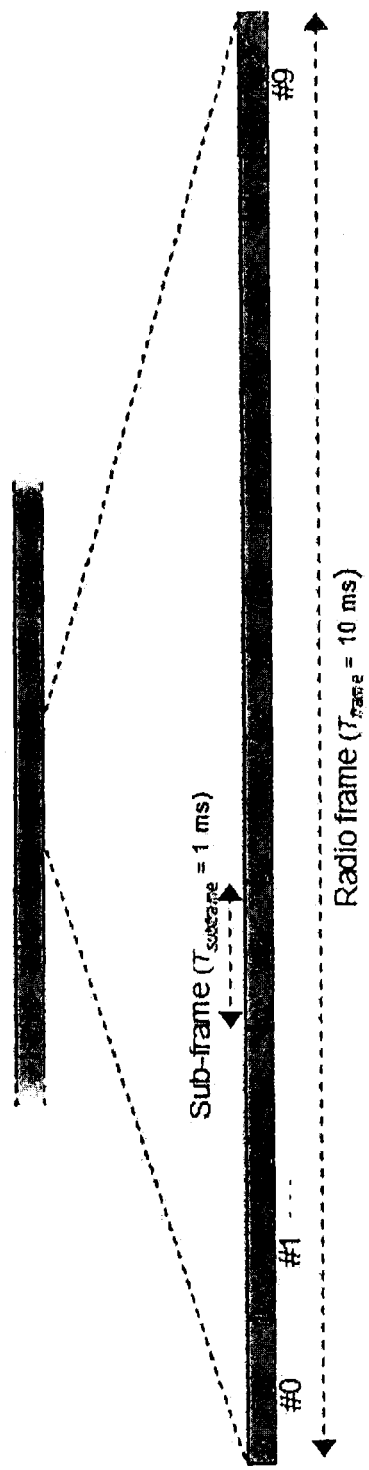
FIG. 4 is a diagram illustrating an LTE time-domain structure.
Figure 5:
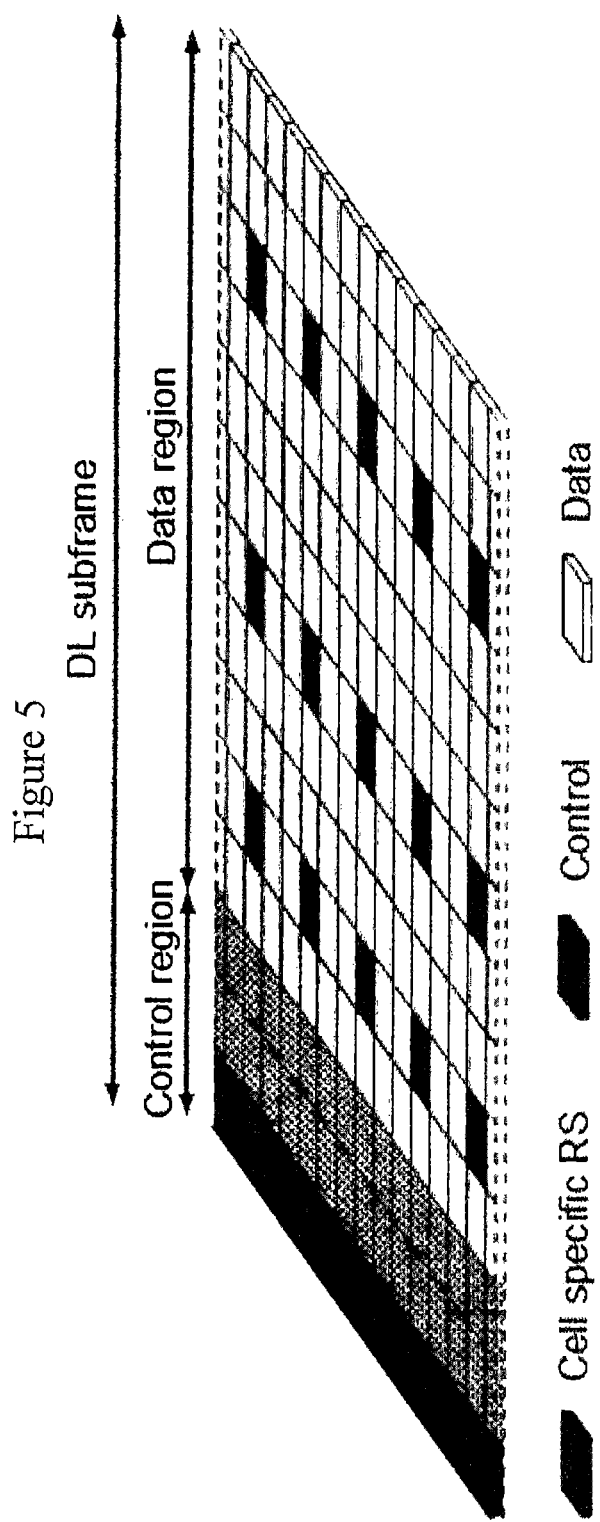
FIG. 5 is a diagram illustrating a mapping of PDCCH, PDSCH, and CRS within an LTE Downlink DL subframe.
Figure 6:
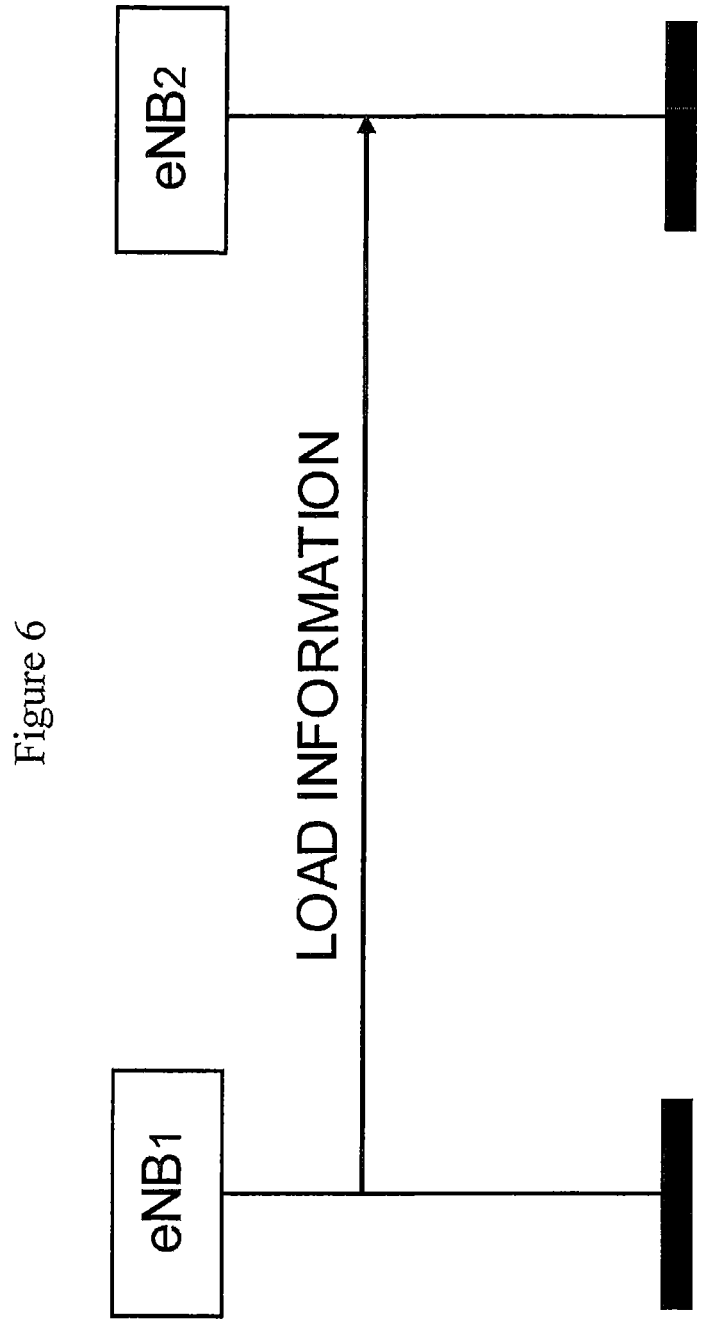
FIG. 6 is a messaging diagram illustrating an X2 load indication procedure.

In further embodiments of inventive concepts, the central coordinator for operations described in FIG. 12 may include/ be an OAM (Operations And Management) system as per FIG. 2. Namely, the central coordinator may be represented either by a DM or by an NM. In such cases, signaling of information between RAN (Radio Access Network) nodes and central coordinator may occur via new or enhanced existing messages over the NE to DM interface and/or over the Itf-N interface.

As discussed above, a possible solution for signaling procedures supporting inter eNB CoMP may include signaling the CoMP Hypothesis, Cell ID, and Benefit Metric in the same message, e.g., over the X2 interface. The meaning of such signaling is that a hypothetical resource allocation proposal is always paired with a parameter (the Benefit Metric) that can be used to estimate the benefit in case the signaled resource allocation is adopted by the cell indicated by the Cell ID associated with the CoMP Hypothesis.

An example of how such information element (IE)s may be encoded is shown in FIGS. 13A-B and 14A-B. FIGS. 13A and 13B illustrate examples of enhancements to the LOAD INFORMATION message according to some embodiments of inventive concepts. FIGS. 14A and 14B illustrate examples of IE Encoding in LOAD INFORMATION message according to some embodiments of inventive concepts.

As discussed above, a possible solution for signaling procedures supporting inter eNB CoMP may include signaling the CoMP Hypothesis, Cell ID, and Benefit Metric in the same message, e.g., over the X2 interface. The meaning of such signaling is that a hypothetical resource allocation proposal is always paired with a parameter (the Benefit Metric) that can be used to estimate the benefit in case the signaled resource allocation is adopted by the cell indicated by the Cell ID associated with the CoMP Hypothesis. An example of how such information element (IE)s may be encoded is shown in FIGS. 13A-B illustrating examples of enhancements to the LOAD INFORMATION message, and FIGS. 14A-B illustrating examples of IE Encoding in a LOAD INFORMATION message.

Moreover, it may be desirable to signal CoMP Hypothesis and Benefit Metric together in a same message and still provide flexibility to use this signaling in different coordination architectures. Examples of such architectures include distributed and centralized architectures (in which case there may be a master node that has access to information from multiple cells and that indicates to several eNBs about their resource allocations to get/provide/obtain CoMP benefits).

Particularly, it may be desirable to cover cases in which the CoMP Hypothesis does not represent a hypothetical resource allocation of the cell indicated by the associated cell ID, but it represents, e.g., a mandate to adopt a certain resource allocation of the cell receiving the CoMP hypothesis, or an already occurred resource allocation, or a case in which calculation of the Benefit Metric was not possible or needed and therefore the allocation needs to be sent alone while the receiver understands why the Benefit Metric is missing.

According to some embodiments of inventive concepts, cases of coordination architectures may allow different CoMP Hypothesis interpretations using special settings of the Benefit Metric.

The Benefit Metric may be encoded as a range of values and a central value. For example, the Benefit Metric could be encoded as an integer range from −100 to 100 in which the central value is zero. In such encoding, positive values may represent a gain, namely positive values may represent that if the CoMP Hypothesis associated with the signaled Cell Id is followed, there will be a gain quantified by the Benefit Metric. Such gain could be, e.g., for the sending node, or for the overall performance of the eCoMP cluster (if sent from a centralized node).

Similarly, if the Benefit Metric is negative, negative values may mean that if the CoMP Hypothesis associated with the signaled Cell Id is followed, there will be a loss quantified by the Benefit Metric. Such loss could be, e.g., for the sending node, or for the overall performance of the eCoMP cluster.

According to some embodiments, if the Benefit Metric is equal to the central value (for example, zero), the meaning of this IE (Information Element) would be that there is neither a positive nor a negative benefit for the associated CoMP Hypothesis (CH) and that the Benefit Metric IE should be discarded. The central value will instead indicate that the message is interpreted in a specified way.

A Benefit Metric equal to zero may mean that, e.g., the CoMP Hypothesis represents a command to the node serving the Cell ID associated to the CoMP Hypothesis to follow the resource allocation included in it.

Alternatively, if the Cell ID of the cell associated with the CoMP Hypothesis (CH) IE is served by the sending node, a Benefit Metric (BM) IE equal to zero and sent by the node may mean that the node has adopted the resource allocation indicated in the CH and is signaling such usage to a neighbor node.

Also, if the CH is associated with a BM equal to zero, the meaning could be that the sending node was not able to calculate the BM or that the benefit associated to the CH did not change with respect to a previously sent version of the CH associated to the same cell ID.

These interpretations of the set of signaled parameters {CoMP Hypothesis, CellID, Benefit Metric} may provide flexibility to use different architectures of coordination while using a same signaling message.

Some embodiments of present inventive concepts may: allow signaling an adopted resource allocation to neighbor nodes; allow signaling that the benefit to a previous CH associated to a certain cell has not changed; allow signaling that the CH associated to a given cell is a mandate to adopt the resource allocation specified in the CH for the cell specified by the associated Cell ID; and/or allow support of different coordination architectures without changing the message content.

Embodiments of present inventive concepts may provide signaling mechanisms to enable support of Inter eNB CoMP in a distributed architecture and/or in a centralized architecture.

Embodiments of present inventive concepts may use an X2 interface procedure not involving a response message (also known as a Class 2 procedure). The latter may help reduce an amount of signaling and may leave freedom to each node on when to trigger signaling of information without the need for a receiving node to follow a behavior suggested by the sender, i.e., maintaining the peer to peer nature of the X2 interface.

Moreover, the same methods may also be enabled with procedures involving a response message, i.e., a Class 1 procedure. In the case of adoption of a Class 1 procedure between node 1 and node 2, the response message from node 2 to node 1 may carry part or all of the information that would otherwise be sent via a single class two message according to the methods of inventive concepts disclosed herein.

In some embodiments of inventive concepts, the BM (Benefit Metric) may be selected from a range of values, with the range of such values being enumerated, symbols, and/or codes. A subrange of the BM range may signify negative benefit, i.e. cost. A subrange of the BM may signify positive benefit, i.e. gain. One value of the BM may be interpreted by the receiving node as a special value that is used to interpret the CH associated with the BM. Such value may be zero or any other chosen value within the pre-established range. In the description below such special value would be referenced as the zero value.

The signaling message may include a CoMP hypothesis (CH) consisting of and/or defining a resource allocation, a CellID for which the CoMP hypothesis is targeted, and a benefit metric (BM).

A resource allocation can be hypothetical, in which case it can be used as an input to a node that performs coordination and makes a coordination decision. A resource allocation can also be a result of coordination, i.e., the output. These two different interpretations of CH may be useful/needed to support various coordination architectures.

Depending on the settings of the triplet {CellID,BM,CH} in the X2 message, different interpretations may be made by the receiving node as described in the following embodiments.

According to some embodiments, the BM may be used to indicate happened resource allocation.

According to some embodiments, the BM (Benefit Metric) associated with a CH for an indicated Cell ID is set to zero by the sending node.

This may signify to the receiving node that the cell identified by the indicated Cell ID associated with the CH signaled and paired together with the BM set to zero has followed the CH and may still be following the resource allocation indicated by the CH.

Stated in other words, the BM set to zero may indicate the resource allocation decision taken by node serving the corresponding cell.

According to some embodiments, the BM may be used to indicate a resource allocation mandate.

According to some embodiments, the BM associated with a CH for a given Cell ID is set to zero by the sending node and the Cell ID is a cell served by the receiving node. If the Cell ID associated with the CH represents one of the cells served by the receiving node, the BM value indicates that the resource allocation contained in the CH shall be adopted (i.e. mandated or strongly recommended) for the cell pointed by the corresponding Cell ID.

According to some embodiments, the BM may be used to indicate lack of BM evaluation.

According to some embodiments, the BM associated with a CH for a given Cell ID is set to zero by the sending node.

This might signify that the sending node was not able to compute the BM for the CH associated with the indicated Cell ID. Similarly, this might mean that there was no change in the BM for the CH associated to the indicated Cell ID, i.e., the CH for the indicated Cell ID maintains the same value indicated previously.

According to some embodiments, the BM may be used to indicate inappropriateness of gain/cost indication.

According to some embodiments, the BM associated with a CH for a given Cell ID is set to zero by the sending node.

This might signify that the node sending the CH associated with the indicated Cell ID does not gain, or lose in case the resource allocation indicated in the CH is followed. The latter could happen if the sending node has no traffic to serve. Hence, a certain resource allocation followed by, e.g., a neighbor cell, would not benefit the sending node because there would be no enhancements in traffic delivery by interference mitigation at neighbor cell.

Equally, the CH sent by the sending node might regard one of the cells served by itself, i.e. the CH might be associated with a Cell ID of a cell the node itself serves. However, given that the node has no traffic to serve, following a certain resource allocation (indicated by the CH) would carry no cost for the sending node. Namely there would be no cost to the node in lowering transmission power on certain resources on a given cell.

Examples of encoding CH and BM will now be discussed.

In the hypothesis that CH and BM are sent in the same message and in order to support the embodiments listed above, the CH and BM could be encoded as indicated below with respect to FIGS. 15A-B.

In the example of FIG. 15 providing encoding for CH and BM, the suggested encoding proposes that the CH is a bit string where each value represents a resource block. When the resource block(s) of one subframe are exhausted, the following values are resource blocks of following subframes.

In the tabular of FIG. 15, the periodicity indicates the period with which the CH shall be repeated. Namely, if Periodicity is 5 ms, the per RB guidance shall be re-applied every 5 ms. The embodiment of indicating BM equal to zero when there is no traffic is beneficial here since the sending node may run out of traffic but the X2 messages continues to periodically be transmitted. In this case, the coordination need not take into account this sending node since it will not have traffic anyway.

The BM in the tabular is a range of integers where the positive values may signify gain, the negative values may signify losses, and the zero value might signify to interpret the CH as per embodiments listed.

The disclosures of all of the following references are hereby incorporated herein in their entireties by reference:

3GPP TS 36.423 V12.0.0, "X2 APPLICATION PROTOCOL," DECEMBER 2013;

3GPP TS 36.213 V11.3.0 "PHYSICAL LAYER PROCEDURES," June 2013; and

R1-141816, LS ON INTER-ENB COMP FOR LTE, Mar. 31, 2014.

Figure 16:
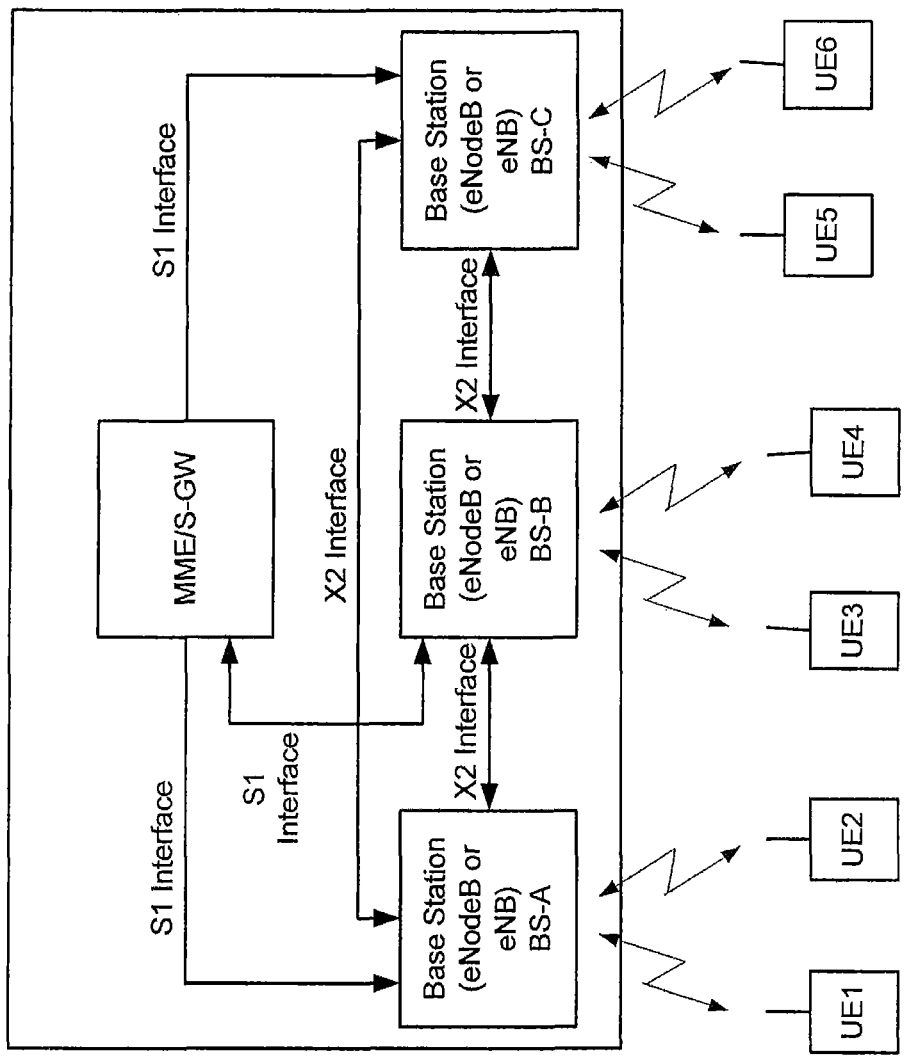
FIG. 16 is a block diagram illustrating a Radio Access Network according to some embodiments of inventive concepts.

FIG. 16 is a block diagram illustrating a Radio Access Network (RAN) according to some embodiments of present inventive concepts. As shown, communications between a plurality of base stations BS-A, BS-B, and BS-C may be provided using respective X2 Interfaces, and communications between base stations and one or more core nodes MME/S-GW may be provided using respective S1 interfaces. Each base station BS may communicate over a radio interface (including uplinks and downlinks) with respective wireless terminals UEs in a respective cell or cells supported by the base station. By way of example, base station BS-A is shown in communication with wireless terminals UE-1 and UE-2, base station BS-B is shown in communication with wireless terminals UE-3 and UE-4, and base station BS-C is shown in communication with wireless terminals UE-5 and UE-6. In embodiments supporting distributed schemes/architectures, each of base stations BS-A, BS-B, and BS-C may be respective peer nodes with respect to distributed scheduling disclosed herein. In embodiments supporting centralized schemes/architectures, one of the base stations (e.g., base station BS-B may serve as a central coordinator node with respect to centralized scheduling disclosed herein.

Figure 17:
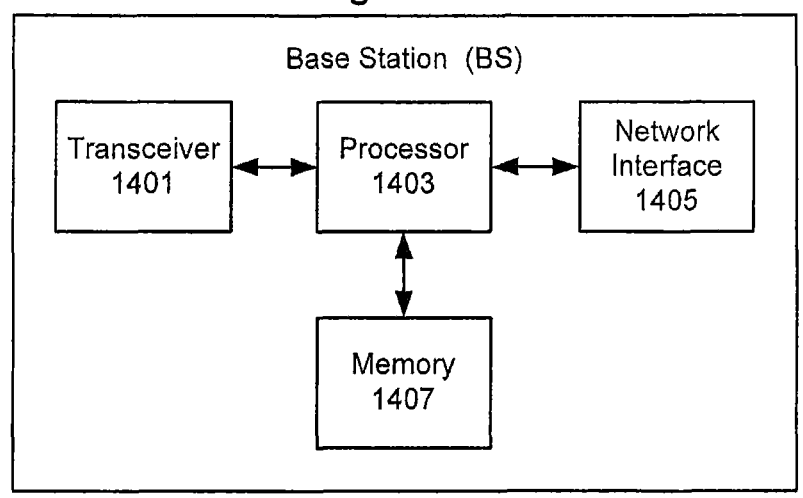
FIG. 17 is a block diagram illustrating elements of a base station according to some embodiments of inventive concepts.

FIG. 17 is a block diagram illustrating elements of a base station BS of FIG. 16. As shown, a base station BS may include a transceiver 1401 configured to provide radio communications with a plurality of wireless terminals, a network interface 1405 configured to provide communications with other base stations of the RAN, and a processor 1403 coupled to the transceiver and the network interface, and a memory (1407) coupled to the processor. The memory 1407 may include computer readable program code that when executed by the processor 1403 causes the processor to perform operations according to embodiments disclosed herein. According to other embodiments, processor 1403 may be defined to include memory so that a memory is not separately provided.

Base station operations according to some embodiments of inventive concepts will be discussed with reference to the flow charts of FIGS. 18, 19, and 20.

Operations of processor 1403 of a base station BS-A are discussed below with respect to the flow chart of FIG. 18 according to some embodiments of inventive concepts. At block 1801, processor 1403 may transmit a first message from base station BS-A through network interface 1405 to another node (e.g., base station BS-B) of the radio access network RAN wherein the first message includes a first Coordinated Multipoint (CoMP) hypothesis field, a first benefit metric field, and a first cell identification field. The first Coordinated Multipoint (CoMP) hypothesis field may include first CoMP hypothesis data that that identifies downlink resources for interference protection. The first benefit metric field may include first benefit metric data that defines an effect on the first base station and/or on another node of the network associated with a resource allocation defined by the first CoMP hypothesis data. The first cell identification field may include first cell identification data that identifies a cell to which the first CoMP hypothesis data applies.

At block 1803, processor 1403 may transmit a second message from base station BS-A through network interface 1405 to another node (e.g., base station BS-B or BS-C) of the radio access network RAN wherein the second message includes a second Coordinated Multipoint (CoMP) hypothesis field including second CoMP hypothesis data, a second benefit metric field including second benefit metric data, and a second cell identification field including second cell identification data.

The second benefit metric data may identify the second CoMP hypothesis data as indicating a resource allocation implemented in a cell identified by the second cell identification data. The cell identified by the second cell identification data may be a cell served by base station BS-A. In an alternative, the cell identified by the second cell identification data may be a cell served by a second base station BS-B different than base station BS-A, and the cell identified by the first cell identification data may be a cell served by a third base station BS-C different than the first base station BS-A and different than the second base station BS-B.

Base station BS-A may be a first base station, the second cell identification data may identify a cell served by a second base station BS-B, and the second benefit metric data may identify the second CoMP hypothesis data as indicating a resource allocation that is mandated for the cell served by the second base station BS-B. The second benefit metric data may identify the second CoMP Hypothesis data as indicating the resource allocation that is mandated for the cell served by the second base station BS-B without considering a benefit to the first base station BS-A and/or other nodes of the network.

The second benefit metric data may indicates that the base station BS-A will not experience a benefit associated with a resource allocation indicated by the second CoMP hypothesis data.

The second benefit metric data may indicate that the base station BS-A will not experience a benefit associated with a resource allocation indicated by the second CoMP hypothesis data and that the base station BS-A will not experience a detriment associated with the resource allocation indicated by the second CoMP hypothesis data.

The second cell identification data may identify a cell served by the base station BS-A, and the second benefit metric data may indicate that the resource allocation indicated by the second CoMP hypothesis data has been applied by the base station BS-A.

The first benefit metric data may have a non-zero value and the second benefit metric data may have a zero value.

The first benefit metric data may have a positive value that defines a benefit associated with the resource allocation defined by the first CoMP hypothesis data.

The first benefit metric data may have a negative value that defines a detriment associated with the resource allocation defined by the first CoMP hypothesis data.

Operations of processor 1403 of a base station BS-A are discussed below with respect to the flow chart of FIG. 19 according to some other embodiments of inventive concepts. At block 1901, processor 1403 may receive a first message through network interface 1405 from another node (e.g., base station BS-B or BS-C) of the radio access network RAN, and the first message may include a first Coordinated Multipoint (CoMP) hypothesis field, a first benefit metric field, and a first cell identification field. The first CoMP hypothesis field may include first CoMP hypothesis data that identifies downlink resources for interference protection. The first cell identification field may include first cell identification data that identifies a cell to which the first CoMP hypothesis data applies. The first benefit metric field may include first benefit metric data that defines an effect on another node of the network associated with a resource allocation defined by the first CoMP hypothesis data.

At block 1903, processor 1403 may receive a second message through network interface 1405 from another node of the radio access network. The second message may include a second Coordinated Multipoint (CoMP) hypothesis field including second CoMP hypothesis data, a second benefit metric field including second benefit metric data, and a second cell identification field including second cell identification data.

The second benefit metric data may identify the second CoMP hypothesis data as indicating a resource allocation implemented in a cell identified by the second cell identification data. The base station may be a first base station BS-A, and the cell identified by the second cell identification data may be a cell served by a second base station BS-B other than the first base station BS-A. The base station may a first base station BS-A, and the cell identified by the second cell identification data may be a cell served by a second base station BS-B that transmitted the second message. The cell identified by the first cell identification data may be a cell served by a base station BS-C different than the first base station BS-A and different than the base station BS-B that transmitted the first message.

The base station is a first base station BS-A, and the second cell identification data may identify a cell served by the first base station BS-A, and the second benefit metric data may identify the second CoMP hypothesis data as indicating a resource allocation that is mandated for the cell served by the first base station BS-A. The second benefit metric data may identify the second CoMP Hypothesis data as indicating the resource allocation that is mandated for the cell served by the first base station BS-A without considering a benefit to another node/nodes of the network.

The second benefit metric data may indicate that no benefit metric from the second message applies to the second CoMP hypothesis data. The second benefit metric may indicate that the first benefit metric data from the first message applies to the second CoMP hypothesis data.

The second benefit metric data may indicate that another base station will not experience a benefit associated with a resource allocation indicated by the second CoMP hypothesis data.

The second benefit metric data may indicate that another base station will not experience a benefit associated with a resource allocation indicated by the second CoMP hypothesis data and that another base station will not experience a detriment associated with the resource allocation indicated by the second CoMP hypothesis data.

The second cell identification data may identify a cell served by another base station, and the second benefit metric data may indicate that the resource allocation indicated by the second CoMP hypothesis data has been applied by the other base station.

The first benefit metric data may have a non-zero value and the second benefit metric data may have a zero value.

The first benefit metric data may have a positive value that defines a benefit associated with the resource allocation defined by the first CoMP hypothesis data.

The first benefit metric data may have a negative value that defines a detriment associated with the resource allocation defined by the first CoMP hypothesis data.

Operations of processor 1403 of a base station BS-A are discussed below with respect to the flow chart of FIG. 20 according to some embodiments of inventive concepts. At block 2001, processor 1403 may communicate a message between the base station BS-A and another node of the radio access network (e.g., base station BS-B or BS-C), and the message may include a Coordinated Multipoint (CoMP) hypothesis field, a benefit metric field, and a cell identification field. Communicating the message may include transmitting the message or receiving the message.

The base station BS-A may be a first base station. The CoMP hypothesis field may include CoMP hypothesis data that identifies downlink resources for interference protection. The cell identification field may include cell identification data that identifies a cell to which the CoMP hypothesis data applies. The benefit metric field may include benefit metric data that defines an effect on the base station BS-A associated with a resource allocation defined by the CoMP hypothesis data. Moreover the cell may be a cell of a second base station BS-B remote from the first base station BS-A.

The CoMP hypothesis field may include CoMP hypothesis data indicating a resource allocation. The cell identification field may include first cell identification data that identifies a cell, and the benefit metric field may include benefit metric data that identifies the CoMP hypothesis data as indicating a resource allocation implemented in the cell identified by the cell identification data. Moreover, the cell identified by the cell identification data may be a cell served by the base station BS-A.

The base station may a first base station BS-A. The CoMP hypothesis field may include CoMP hypothesis data indicating a resource allocation, the cell identification field may include cell identification data that identifies a cell, and the benefit metric field may include benefit metric data that identifies the CoMP hypothesis data as indicating a resource allocation implemented in the cell identified by the first cell identification data. Moreover, the cell identified by the cell identification data may be a cell served by a second base station BS-B different than the first base station BS-A.

The base station may be a first base station BS-A. The CoMP hypothesis field may include CoMP hypothesis data, the cell identification field may include cell identification data that identifies a cell served by a second base station BS-B, and the benefit metric field may include benefit metric data that identifies the CoMP hypothesis data as indicating a resource allocation that is mandated for the cell served by the second base station BS-B. The benefit metric data may identify the CoMP Hypothesis data as indicating the resource allocation that is mandated for the cell served by the second base station BS-B without considering a benefit to the first base station BS-A and/or other nodes of the network.

The CoMP hypothesis field may include CoMP hypothesis data, the benefit metric field may include benefit metric data, and the cell identification field may include cell identification data. Moreover, the benefit metric data may indicate that the base station BS-A will not experience a benefit associated with the resource allocation indicated by the CoMP hypothesis data and that the base station BS-A will not experience a detriment associated with the resource allocation indicated by the CoMP hypothesis data.

The CoMP hypothesis field may includes CoMP hypothesis data that identifies downlink resources for interference protection. The cell identification field may include cell identification data that identifies a cell to which the CoMP hypothesis data applies. The benefit metric field may include benefit metric data that defines an effect on another base station associated with a resource allocation defined by the CoMP hypothesis data.

The CoMP hypothesis field may include CoMP hypothesis data that identifies downlink resources for interference protection. The cell identification field may include cell identification data that identifies a cell to which the CoMP hypothesis data applies. The benefit metric field may include benefit metric data that defines an effect on another base station associated with a resource allocation defined by the CoMP hypothesis data, and the cell may be a cell of the base station BS-A.

Communicating the message may include communicating the message over an X2 interface, and/or communicating the message may include communicating the message as a Load Information message, with the CoMP hypothesis, the benefit metric, and the cell identification being elements of the Load Information message. The CoMP hypothesis may identify downlink resources for interference protection, and/or the cell identification may identify a cell to which the CoMP hypothesis applies.

The CoMP hypothesis field may include CoMP hypothesis data indicating a resource allocation. The cell identification field may include cell identification data that identifies a cell, and the benefit metric field may include benefit metric data that identifies the CoMP hypothesis data as indicating a resource allocation implemented in the cell identified by the second cell identification data.

The CoMP hypothesis field may include CoMP hypothesis data indicating a resource allocation. The cell identification field may include cell identification data that identifies a cell, and the benefit metric field may include benefit metric data that identifies the CoMP hypothesis data as indicating a resource allocation implemented in the cell identified by the second cell identification data. The cell identified by the cell identification data may a cell served by another base station (e.g., base station BS-B or base station BS-C) different than the base station BS-A.

The CoMP hypothesis field may include CoMP hypothesis data indicating a resource allocation, the cell identification field may include cell identification data that identifies a cell, and the benefit metric field may include benefit metric data that identifies the CoMP hypothesis data as indicating a resource allocation implemented in the cell identified by the second cell identification data. The cell identified by the cell identification data may be a cell served by another base station (e.g., base station BS-C) different than the base station BS-A and different than a base station (e.g., base station BS-B) that transmitted the message.

The CoMP hypothesis field may include CoMP hypothesis data, and the cell identification field may include cell identification data that identifies a cell served by the base station BS-A. The benefit metric field may include benefit metric data that identifies the CoMP hypothesis data as indicating a resource allocation that is mandated for the cell served by the base station BS-A. The benefit metric data may identify the CoMP Hypothesis data as indicating the resource allocation that is mandated for the cell served by the base station BS-A without considering a benefit to another base station and/or another node/nodes of the network.

The CoMP hypothesis field may include CoMP hypothesis data, the cell identification field may include cell identification data, and the benefit metric field may include benefit metric data that indicates that no benefit metric from the message applies to the CoMP hypothesis data. The benefit metric data may indicate that previous benefit metric data from a previous message applies to the CoMP hypothesis data.

The CoMP hypothesis field may include CoMP hypothesis data, the benefit metric field may include benefit metric data, and the cell identification field may include cell identification data. The benefit metric data may indicate that another base station will not experience a benefit associated with a resource allocation indicated by the CoMP hypothesis data.

The CoMP hypothesis field may include CoMP hypothesis data, the benefit metric field may include benefit metric data, and the cell identification field may include cell identification data. The benefit metric data may indicate that another base station will not experience a benefit associated with a resource allocation indicated by the CoMP hypothesis data and that another base station will not experience a detriment associated with the resource allocation indicated by the CoMP hypothesis data.

The CoMP hypothesis field may include CoMP hypothesis data, the benefit metric field may include benefit metric data, and the cell identification field may include cell identification data. The cell identification data may identify a cell served by the first base station, and the benefit metric data may indicates that the resource allocation indicated by the second CoMP hypothesis data has been applied by another base station. The benefit metric data, for example, may have a zero value.

In example embodiments discussed below, a first base station may refer to a base station BS-A or BS-B depending on the context of the embodiment. Similarly, a second base station may refer to a base station BS-A or BS-B depending on the context of the embodiments.

Example Embodiments:

Embodiment 1. A method of operating a first base station in a radio access network (RAN) including the first base station, the method comprising: transmitting a message from the first base station to another node of the radio access network wherein the message includes a Coordinated Multipoint (CoMP) hypothesis field, a benefit metric field, and a cell identification field.

Embodiment 2. The method of Embodiment 1 wherein the message is a first message, wherein the CoMP hypothesis field is a first CoMP hypothesis field including first CoMP hypothesis data that identifies downlink resources for interference protection, wherein the cell identification field is a first cell identification field that includes first cell identification data that identifies a cell to which the CoMP hypothesis data applies, and wherein the benefit metric field is a first benefit metric field that includes first benefit metric data that defines an effect on the first base station and/or on another node of the network associated with a resource allocation defined by the first CoMP hypothesis data, the method further comprising: transmitting a second message from the first base station to another node of the radio access network wherein the second message includes a second Coordinated Multipoint (CoMP) hypothesis field including second CoMP hypothesis data, a second benefit metric field including second benefit metric data, and a second cell identification field including second cell identification data.

Embodiment 3. The method of Embodiment 2 wherein the second benefit metric data identifies the second CoMP hypothesis data as indicating a resource allocation implemented in a cell identified by the second cell identification data.

Embodiment 4. The method of Embodiment 3 wherein the cell identified by the second cell identification data is a cell served by the first base station.

Embodiment 5. The method of Embodiment 3 wherein the cell identified by the second cell identification data is a cell served by a second base station different than the first base station.

Embodiment 6. The method of any of Embodiments 4-5 wherein the cell identified by the first cell identification data is a cell served by a third base station different than the first base station and different than the second base station.

Embodiment 7. The method of Embodiment 2 wherein the second cell identification data identifies a cell served by the second base station, and wherein the second benefit metric data identifies the second CoMP hypothesis data as indicating a resource allocation that is mandated for the cell served by the second base station.

Embodiment 8. The method of Embodiment 7 wherein the second benefit metric data identifies the second CoMP Hypothesis data as indicating the resource allocation that is mandated for the cell served by the second base station without considering a benefit to the first base station and/or other nodes of the network.

Embodiment 9. The method of Embodiment 2 wherein the second benefit metric data indicates that no benefit metric from the second message applies to the second CoMP hypothesis data.

Embodiment 10. The method of Embodiment 9 wherein the second benefit metric indicates that the first benefit metric data from the first message applies to the second CoMP hypothesis data.

Embodiment 11. The method of Embodiment 2 wherein the second benefit metric data indicates that the first base station will not experience a benefit associated with the a resource allocation indicated by the second CoMP hypothesis data.

Embodiment 12. The method of Embodiment 2 wherein the second benefit metric data indicates that the first base station will not experience a benefit associated with the a resource allocation indicated by the second CoMP hypothesis data and that the first base station will not experience a detriment associated with the a resource allocation indicated by the second CoMP hypothesis data.

Embodiment 13. The method of Embodiment 2 wherein the second cell identification data identifies a cell served by the first base station, and wherein the second benefit metric data indicates that the resource allocation indicated by the second CoMP hypothesis data has been applied by the first base station.

Embodiment 14. The method of any of Embodiments 2-13 wherein the first benefit metric data has a non-zero value and the second benefit metric data has a zero value.

Embodiment 15. The method of any of Embodiments 2-14 wherein the first benefit metric data has a positive value that defines a benefit associated with the resource allocation defined by the first CoMP hypothesis data.

Embodiment 16. The method of any of Embodiments 2-14 wherein the first benefit metric data has a negative value that defines a detriment associated with the resource allocation defined by the first CoMP hypothesis data.

Embodiment 17. The method of Embodiment 1 wherein the CoMP hypothesis field includes CoMP hypothesis data that identifies downlink resources for interference protection, wherein the cell identification field includes cell identification data that identifies a cell to which the CoMP hypothesis data applies, and wherein the benefit metric field includes benefit metric data that defines an effect on the first base station associated with a resource allocation defined by the CoMP hypothesis data.

Embodiment 18. The method of Embodiment 17 wherein the cell is a cell of a second base station remote from the first base station.

Embodiment 19. The method of any of Embodiments 1-18 wherein transmitting the message comprises transmitting the message over an X2 interface.

Embodiment 20. The method of any of Embodiments 2-19 wherein transmitting the second message comprises transmitting the second message over an X2 interface.

Embodiment 21. The method of any of Embodiment 1-20 wherein transmitting the message comprises transmitting the message as a Load Information message, wherein the CoMP hypothesis, the benefit metric, and the cell identification are elements of the Load Information message.

Embodiment 22. The method of any of Embodiments 1-21 wherein the CoMP hypothesis identifies downlink resources for interference protection.

Embodiment 23. The method of any of Embodiments 1-22 wherein the cell identification identifies a cell to which the CoMP hypothesis applies.

Embodiment 24. The method of Embodiment 1 wherein CoMP hypothesis field includes CoMP hypothesis data indicating a resource allocation, wherein the cell identification field includes cell identification data that identifies a cell, and wherein the benefit metric field includes benefit metric data that identifies the CoMP hypothesis data as indicating a resource allocation implemented in the cell identified by the second cell identification data.

Embodiment 25. The method of Embodiment 24 wherein the cell identified by the cell identification data is a cell served by the first base station.

Embodiment 26. The method of Embodiment 24 wherein the cell identified by the cell identification data is a cell served by a second base station different than the first base station.

Embodiment 27. The method of Embodiment 1 wherein the CoMP hypothesis field includes CoMP hypothesis data, wherein the cell identification field includes cell identification data that identifies a cell served by a second base station, and wherein the benefit metric field includes benefit metric data that identifies the CoMP hypothesis data as indicating a resource allocation that is mandated for the cell served by the second base station.

Embodiment 28. The method of Embodiment 27 wherein the benefit metric data identifies the CoMP Hypothesis data as indicating the resource allocation that is mandated for the cell served by the second base station without considering a benefit to the first base station and/or other nodes of the network.

Embodiment 29. The method of Embodiment 1 wherein the CoMP hypothesis field includes CoMP hypothesis data, wherein the cell identification field includes cell identification data, and wherein the benefit metric field includes benefit metric data that indicates that no benefit metric from the message applies to the CoMP hypothesis data.

Embodiment 30. The method of Embodiment 29 wherein the benefit metric data indicates that previous benefit metric data from a previous message applies to the CoMP hypothesis data.

Embodiment 31. The method of Embodiment 1 wherein the CoMP hypothesis field includes CoMP hypothesis data, wherein the benefit metric field includes benefit metric data, wherein the cell identification field includes cell identification data, and wherein the benefit metric data indicates that the first base station will not experience a benefit associated with the a resource allocation indicated by the CoMP hypothesis data.

Embodiment 32. The method of Embodiment 1 wherein the CoMP hypothesis field includes CoMP hypothesis data, wherein the benefit metric field includes benefit metric data, wherein the cell identification field includes cell identification data, and wherein the benefit metric data indicates that the first base station will not experience a benefit associated with the resource allocation indicated by the CoMP hypothesis data and that the first base station will not experience a detriment associated with the resource allocation indicated by the CoMP hypothesis data.

Embodiment 33. The method of Embodiment 1 wherein the CoMP hypothesis field includes CoMP hypothesis data, wherein the benefit metric field includes benefit metric data, wherein the cell identification field includes cell identification data, and wherein the cell identification data identifies a cell served by the first base station, and wherein the benefit metric data indicates that the resource allocation indicated by the second CoMP hypothesis data has been applied by the first base station.

Embodiment 34. The method of any of Embodiments 24-33 wherein the benefit metric data has a zero value.

Embodiment 35. A method of operating a first base station in a radio access network (RAN) including the first base station, the method comprising: receiving a message at the first base station from another node of the radio access network wherein the message includes a Coordinated Multipoint (CoMP) hypothesis field, a benefit metric field, and a cell identification field.

Embodiment 36. The method of Embodiment 35 wherein the message is a first message, wherein the CoMP hypothesis field is a first CoMP hypothesis field including first CoMP hypothesis data that identifies downlink resources for interference protection, wherein the cell identification field is a first cell identification field that includes first cell identification data that identifies a cell to which the CoMP hypothesis data applies, and wherein the benefit metric field is a first benefit metric field that includes first benefit metric data that defines an effect on another node of the network associated with a resource allocation defined by the first CoMP hypothesis data, the method further comprising: receiving a second message from another node of the radio access network wherein the second message includes a second Coordinated Multipoint (CoMP) hypothesis field including second CoMP hypothesis data, a second benefit metric field including second benefit metric data, and a second cell identification field including second cell identification data.

Embodiment 37. The method of Embodiment 36 wherein the second benefit metric data identifies the second CoMP hypothesis data as indicating a resource allocation implemented in a cell identified by the second cell identification data.

Embodiment 38. The method of Embodiment 37 wherein the cell identified by the second cell identification data is a cell served by a base station other than the first base station.

Embodiment 39. The method of Embodiment 37 wherein the cell identified by the second cell identification data is a cell served by a second base station that transmitted the second message.

Embodiment 40. The method of any of Embodiments 38-39 wherein the cell identified by the first cell identification data is a cell served by a base station different than the first base station and different than the base station that transmitted the first message.

Embodiment 41. The method of Embodiment 36 wherein the second cell identification data identifies a cell served by the first base station, and wherein the second benefit metric data identifies the second CoMP hypothesis data as indicating a resource allocation that is mandated for the cell served by the first base station.

Embodiment 42. The method of Embodiment 41 wherein the second benefit metric data identifies the second CoMP Hypothesis data as indicating the resource allocation that is mandated for the cell served by the first base station without considering a benefit to another node/nodes of the network.

Embodiment 43. The method of Embodiment 36 wherein the second benefit metric data indicates that no benefit metric from the second message applies to the second CoMP hypothesis data.

Embodiment 44. The method of Embodiment 43 wherein the second benefit metric indicates that the first benefit metric data from the first message applies to the second CoMP hypothesis data.

Embodiment 45. The method of Embodiment 36 wherein the second benefit metric data indicates that another base station will not experience a benefit associated with the a resource allocation indicated by the second CoMP hypothesis data.

Embodiment 46. The method of Embodiment 36 wherein the second benefit metric data indicates that another base station will not experience a benefit associated with the a resource allocation indicated by the second CoMP hypothesis data and that another base station will not experience a detriment associated with the a resource allocation indicated by the second CoMP hypothesis data.

Embodiment 47. The method of Embodiment 36 wherein the second cell identification data identifies a cell served by another base station, and wherein the second benefit metric data indicates that the resource allocation indicated by the second CoMP hypothesis data has been applied by the other base station.

Embodiment 48. The method of any of Embodiments 36-47 wherein the first benefit metric data has a non-zero value and the second benefit metric data has a zero value.

Embodiment 49. The method of any of Embodiments 36-48 wherein the first benefit metric data has a positive value that defines a benefit associated with the resource allocation defined by the first CoMP hypothesis data.

Embodiment 50. The method of any of Embodiments 36-48 wherein the first benefit metric data has a negative value that defines a detriment associated with the resource allocation defined by the first CoMP hypothesis data.

Embodiment 51. The method of Embodiment 35 wherein the CoMP hypothesis field includes CoMP hypothesis data that identifies downlink resources for interference protection, wherein the cell identification field includes cell identification data that identifies a cell to which the CoMP hypothesis data applies, and wherein the benefit metric field includes benefit metric data that defines an effect on another base station associated with a resource allocation defined by the CoMP hypothesis data.

Embodiment 52. The method of Embodiment 51 wherein the cell is a cell of a first base station.

Embodiment 53. The method of any of Embodiments 35-52 wherein receiving the message comprises receiving the message over an X2 interface.

Embodiment 54. The method of any of Embodiments 36-53 wherein receiving the second message comprises receiving the second message over an X2 interface.

Embodiment 55. The method of any of Embodiment 35-54 wherein receiving the message comprises receiving the message as a Load Information message, wherein the CoMP hypothesis, the benefit metric, and the cell identification are elements of the Load Information message.

Embodiment 56. The method of any of Embodiments 35-55 wherein the CoMP hypothesis identifies downlink resources for interference protection.

Embodiment 57. The method of any of Embodiments 35-56 wherein the cell identification identifies a cell to which the CoMP hypothesis applies.

Embodiment 58. The method of Embodiment 35 wherein CoMP hypothesis field includes CoMP hypothesis data indicating a resource allocation, wherein the cell identification field includes cell identification data that identifies a cell, and wherein the benefit metric field includes benefit metric data that identifies the CoMP hypothesis data as indicating a resource allocation implemented in the cell identified by the second cell identification data.

Embodiment 59. The method of Embodiment 58 wherein the cell identified by the cell identification data is a cell served by another base station different than the first base station.

Embodiment 60. The method of Embodiment 58 wherein the cell identified by the cell identification data is a cell served by another base station different than the first base station and different than a base station that transmitted the message.

Embodiment 61. The method of Embodiment 35 wherein the CoMP hypothesis field includes CoMP hypothesis data, wherein the cell identification field includes cell identification data that identifies a cell served by the first base station, and wherein the benefit metric field includes benefit metric data that identifies the CoMP hypothesis data as indicating a resource allocation that is mandated for the cell served by the first base station.

Embodiment 62. The method of Embodiment 61 wherein the benefit metric data identifies the CoMP Hypothesis data as indicating the resource allocation that is mandated for the cell served by the first base station without considering a benefit to another base station and/or another node/nodes of the network.

Embodiment 63. The method of Embodiment 35 wherein the CoMP hypothesis field includes CoMP hypothesis data, wherein the cell identification field includes cell identification data, and wherein the benefit metric field includes benefit metric data that indicates that no benefit metric from the message applies to the CoMP hypothesis data.

Embodiment 64. The method of Embodiment 63 wherein the benefit metric data indicates that previous benefit metric data from a previous message applies to the CoMP hypothesis data.

Embodiment 65. The method of Embodiment 35 wherein the CoMP hypothesis field includes CoMP hypothesis data, wherein the benefit metric field includes benefit metric data, wherein the cell identification field includes cell identification data, and wherein the benefit metric data indicates that another base station will not experience a benefit associated with the a resource allocation indicated by the CoMP hypothesis data.

Embodiment 66. The method of Embodiment 35 wherein the CoMP hypothesis field includes CoMP hypothesis data, wherein the benefit metric field includes benefit metric data, wherein the cell identification field includes cell identification data, and wherein the benefit metric data indicates that another base station will not experience a benefit associated with a resource allocation indicated by the CoMP hypothesis data and that another base station will not experience a detriment associated with the resource allocation indicated by the CoMP hypothesis data.

Embodiment 67. The method of Embodiment 35 wherein the CoMP hypothesis field includes CoMP hypothesis data, wherein the benefit metric field includes benefit metric data, wherein the cell identification field includes cell identification data, wherein the cell identification data identifies a cell served by the first base station, and wherein the benefit metric data indicates that the resource allocation indicated by the second CoMP hypothesis data has been applied by another base station.

Embodiment 68. The method of any of Embodiments 58-67 wherein the benefit metric data has a zero value.

Embodiment 69. A base station of a radio access network adapted to perform according to any one of embodiments 1-68.

Embodiment 70. A base station of a radio access network, the base station comprising: a transceiver configured to provide radio communications with a plurality of wireless terminals; a network interface configured to provide communications with other base stations of the radio access network; and a processor coupled to the transceiver and the network interface, wherein the processor is adapted to perform according to any one of embodiments 1-68.

Embodiment 71. A base station of a radio access network, the base station comprising: a transceiver configured to provide radio communications with a plurality of wireless terminals; a network interface configured to provide communications with other base stations of the radio access network; and a processor coupled to the transceiver and the network interface; and memory coupled to the processor and comprising computer readable program code that when executed by the processor causes the processor to perform operations according to any one of Embodiments 1-68.

Further Definitions:

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

In the drawings and specification, there have been disclosed typical preferred embodiments of the invention and, although specific terms are employed, they are used in a generic and descriptive sense only and not for purposes of limitation, the scope of inventive concepts being set forth in the following claims.

That which is claimed is:

1. A method of operating a first base station in a radio access network (RAN) including the first base station, the method comprising:
   communicating a message between the first base station and another node of the radio access network wherein the message includes a Coordinated Multipoint (CoMP) hypothesis field, a benefit metric field, and a cell identification field,
   wherein the CoMP hypothesis field includes CoMP hypothesis data and wherein the CoMP hypothesis data identifies downlink resources for interference protection,
   wherein the cell identification field includes cell identification data that identifies a cell served by a second base station, and
   wherein the benefit metric field includes benefit metric data that identifies the CoMP hypothesis data as indicating a resource allocation that is mandated for the cell served by the second base station without considering a benefit to the first base station and/or other nodes of the network.

2. The method of claim 1 wherein communicating comprises transmitting the message from the first base station to the another node of the radio access network wherein the message includes the Coordinated Multipoint (CoMP) hypothesis field, the benefit metric field, and the cell identification field so that the benefit metric field including the benefit metric data that identifies the CoMP hypothesis data as indicating a resource allocation that is mandated is transmitted from the first base station to the another node.

3. The method of claim 1 wherein communicating comprises receiving the message at the first base station from the another node of the radio access network wherein the message includes the Coordinated Multipoint (CoMP) hypothesis field, the benefit metric field, and the cell identification field.

4. The method of claim 1 wherein communicating the message comprises communicating the message between the first and second base stations over a peer to peer X2 interface.

5. The method of claim 4 wherein communicating the message comprises communicating the message as an X2 Load Information message, wherein the CoMP hypothesis field, the benefit metric field, and the cell identification field are elements of the X2 Load Information message.

6. The method of claim 1, wherein the benefit metric data indicates that the first base station will not experience a benefit associated with the resource allocation indicated by the CoMP hypothesis data and that the first base station will not experience a detriment associated with the resource allocation indicated by the CoMP hypothesis data.

7. The method of claim 2, wherein the another node to which the message is transmitted is the second base station.

8. A first base station of a radio access network, the first base station comprising:
   a transceiver configured to provide radio communications with a plurality of wireless terminals;
   a network interface configured to provide communications with other base stations of the radio access network; and
   a processor coupled to the transceiver and the network interface, wherein the processor is adapted to:
      communicate a message through the network interface between the first base station and another node of the radio access network wherein the message includes a Coordinated Multipoint (CoMP) hypothesis field, a benefit metric field, and a cell identification field,
      wherein the CoMP hypothesis field includes CoMP hypothesis data and wherein the CoMP hypothesis data identifies downlink resources for interference protection,
      wherein the cell identification field includes cell identification data that identifies a cell served by a second base station, and
      wherein the benefit metric field includes benefit metric data that identifies the CoMP hypothesis data as indicating a resource allocation that is mandated for the cell served by the second base station without considering a benefit to the first base station and/or other nodes of the network.

9. The first base station of claim 8, wherein the benefit metric data indicates that the first base station will not experience a benefit associated with the resource allocation indicated by the CoMP hypothesis data and that the first base station will not experience a detriment associated with the resource allocation indicated by the CoMP hypothesis data.

10. The first base station of claim 8 wherein the processor is configured to communicate the message by transmitting the message through the network interface from the first base station to the another node of the radio access network wherein the message includes the Coordinated Multipoint (CoMP) hypothesis field, the benefit metric field, and the cell identification field so that the benefit metric field including the benefit metric data that identifies the CoMP hypothesis data as indicating a resource allocation that is mandated is transmitted from the first base station to the another node.

11. The first base station of claim 8 wherein the processor is configured to communicate the message by receiving the message through the network interface at the first base station from the another node of the radio access network wherein the message includes the Coordinated Multipoint (CoMP) hypothesis field, the benefit metric field, and the cell identification field.

12. The first base station of claim 8 wherein the processor is configured to communicate the message between the first and second base stations over a peer to peer X2 interface.

13. The first base station of claim 12 wherein the processor is configured to communicate the message as an X2 Load Information message, wherein the CoMP hypothesis field, the benefit metric field, and the cell identification field are elements of the X2 Load Information message.

14. The first base station of claim 12, wherein the another node to which the message is transmitted is the second base station.

15. A method of operating a first base station in a radio access network (RAN) including the first base station, the method comprising:
   communicating a message between the first base station and another node of the radio access network wherein the message includes a Coordinated Multipoint (CoMP) hypothesis field, a benefit metric field, a cell identification field, and a measurement list,
   wherein the CoMP hypothesis field includes CoMP hypothesis data,
   wherein the cell identification field includes cell identification data that identifies a cell served by a second base station,
   wherein the benefit metric field includes benefit metric data that identifies the CoMP hypothesis data as indicating a resource allocation that is mandated for the cell served by the second base station, and
   wherein the measurement list provides measurements collected by wireless terminals in a cell or cells associated with at least one of the first and second base stations.

16. The method of claim 15, wherein communicating comprises transmitting the message from the first base station to the another node of the radio access network, and wherein the measurement list provides measurements collected by wireless terminals in a cell of the first base station.

17. The method of claim 16, wherein transmitting the message comprises transmitting the message from the first base station to the second base station over a peer to peer X2 interface.

18. The method of claim 15, wherein communicating comprises receiving the message at the first base station from the another node of the radio access network, and wherein the measurement list provides measurements collected by wireless terminals in a cell of the second base station, the method further comprising:
   deriving scheduling for the first base station based on the CoMP hypothesis data, the benefic metric, and the measurement list.

19. The method of claim 18, wherein receiving the message comprises transmitting the message at the first base station from the second base station over a peer to peer X2 interface.

* * * * *